(12) United States Patent
Takahashi et al.

(10) Patent No.: US 10,291,848 B2
(45) Date of Patent: May 14, 2019

(54) IMAGE DISPLAY SYSTEM AND IMAGE DISPLAY METHOD

(71) Applicants: Daiwa House Industry Co., Ltd., Osaka (JP); Sony Corporation, Tokyo (JP)

(72) Inventors: Yasuo Takahashi, Osaka (JP); Tsukasa Nakano, Osaka (JP); Takashi Orime, Osaka (JP); Yuichiro Takeuchi, Tokyo (JP); Junichi Rekimoto, Tokyo (JP); Yasushi Miyajima, Tokyo (JP)

(73) Assignees: Daiwa House Industry Co., Ltd., Osaka (JP); Sony Corporation, Tokyo (JP)

( * ) Notice: Subject to any disclaimer, the term of this patent is extended or adjusted under 35 U.S.C. 154(b) by 0 days.

(21) Appl. No.: 15/562,562

(22) PCT Filed: Mar. 30, 2016

(86) PCT No.: PCT/JP2016/060531
§ 371 (c)(1),
(2) Date: Sep. 28, 2017

(87) PCT Pub. No.: WO2016/159164
PCT Pub. Date: Oct. 6, 2016

(65) Prior Publication Data
US 2018/0091738 A1 Mar. 29, 2018

(30) Foreign Application Priority Data

Mar. 31, 2015 (JP) .................................. 2015-071762

(51) Int. Cl.
*H04N 5/225* (2006.01)
*H04N 5/232* (2006.01)
*H04N 7/14* (2006.01)

(52) U.S. Cl.
CPC ..... *H04N 5/23254* (2013.01); *H04N 5/23293* (2013.01); *H04N 7/14* (2013.01); *H04N 7/144* (2013.01); *H04N 7/147* (2013.01)

(58) Field of Classification Search
None
See application file for complete search history.

(56) References Cited

U.S. PATENT DOCUMENTS

2004/0075735 A1* 4/2004 Marmaropoulos ..... G06F 3/011
348/51
2007/0200925 A1 8/2007 Kim
(Continued)

FOREIGN PATENT DOCUMENTS

JP 2006040083 A 2/2006
JP 2009122716 A 6/2009
(Continued)

*Primary Examiner* — Twyler L Haskins
*Assistant Examiner* — Dwight Alex C Tejano
(74) *Attorney, Agent, or Firm* — Young Basile Hanlon & MacFarlane, P.C.

(57) ABSTRACT

When a user viewing an image of a conversation partner displayed on a display moves, a displayed image is more easily switched to an image reflecting a position of the user after the movement. When an image of a first user is displayed on a display of a second user, the image of the first user taken by an imaging device and an image of a background taken by the imaging device are acquired, and the acquired images are composited with each other, thereby displaying on the display a composite image in which the first user is positioned in front of the background. Moreover, when a movement of the face of the second user with respect to the display is detected, transition processing of causing the composite image displayed on the display to transition from a state before the detection of the movement of the face is carried out.

10 Claims, 15 Drawing Sheets

(56) References Cited

U.S. PATENT DOCUMENTS

| | | | |
|---|---|---|---|
| 2008/0246759 A1* | 10/2008 | Summers | G06F 3/0304 345/420 |
| 2008/0303949 A1* | 12/2008 | Ciudad | H04N 7/147 348/586 |
| 2009/0219379 A1* | 9/2009 | Rossato | H04N 5/272 348/14.01 |
| 2010/0245535 A1* | 9/2010 | Mauchly | G06T 15/20 348/14.08 |
| 2010/0295958 A1* | 11/2010 | Larsson | G06F 3/0346 348/222.1 |
| 2013/0007638 A1* | 1/2013 | Basso | G09F 9/35 715/757 |
| 2013/0093838 A1* | 4/2013 | Tan | H04N 7/144 348/14.16 |
| 2014/0218467 A1* | 8/2014 | You | H04N 7/142 348/14.16 |
| 2014/0267584 A1* | 9/2014 | Atzpadin | H04N 7/144 348/14.16 |
| 2014/0313277 A1* | 10/2014 | Yarosh | H04N 7/15 348/14.08 |

FOREIGN PATENT DOCUMENTS

| | | | |
|---|---|---|---|
| JP | 2012085159 | A | 4/2012 |
| JP | 2013116311 | A | 6/2013 |
| JP | 2014071871 | A | 4/2014 |
| JP | 2014155693 | A | 8/2014 |
| WO | 2009122716 | A1 | 10/2009 |

* cited by examiner

FIG. 5
TAKEN IMAGE (ACTUAL IMAGE)
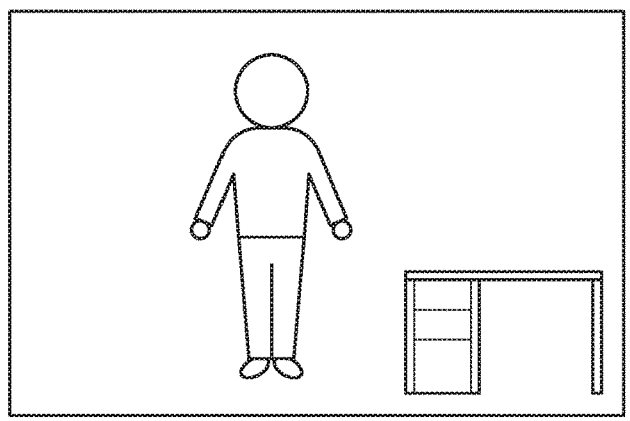
DEPTH DATA
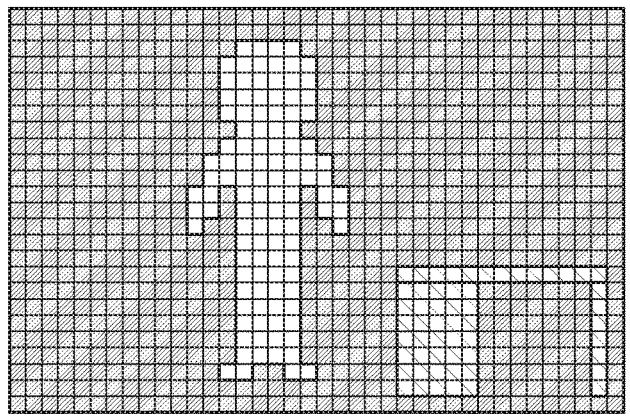
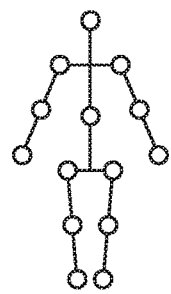
SKELETON MODEL
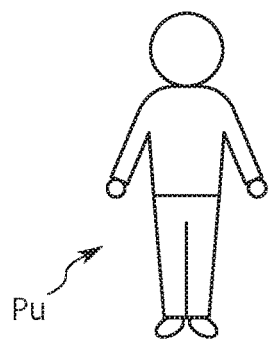
Pu

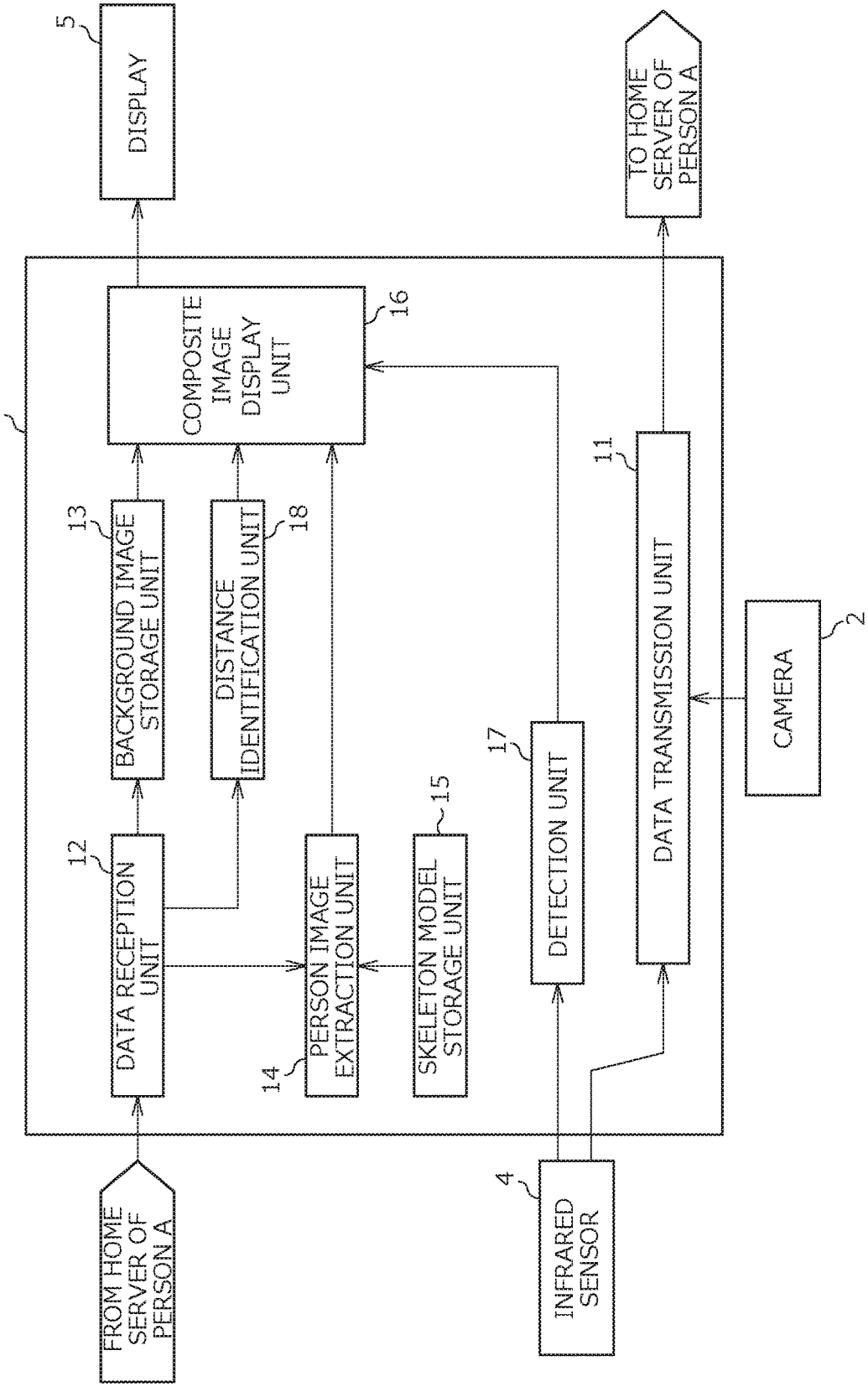

SECOND DIRECTION ← → FIRST DIRECTION

SECOND DIRECTION ←――――――――→ FIRST DIRECTION

IMAGE DISPLAY SYSTEM AND IMAGE DISPLAY METHOD

CROSS REFERENCE TO RELATED APPLICATION

This application claims priority to Japanese Patent Application No. 2015-071762, filed on Mar. 31, 2015, and is herein incorporated by reference in its entirety.

TECHNICAL FIELD

The present invention relates to an image display system and an image display method, and more particularly to an image display system and an image display method for displaying an image of a conversation partner at a remote location on a display of a conversing person.

BACKGROUND

There are already known a conversation of users present in spaces remote from each other while viewing images of their opposite parties by means of communication technology, and an image display system for realizing such conversation. In this system, image data when the image of one user is taken is transmitted, and the image data is received and expanded on the side of the other users. Thus, the image of the user on the one side is displayed on a display screen of the opposite user. As a result, the user viewing the display screen feels that as if the user were facing the conversation partner.

Moreover, in recent years, technologies of changing, when the position of the view point of a user viewing a display screen changes, an image displayed on the display screen changes in association with the change in the position (refer to JP 2012-85159A and JP 2014-71871A). Specifically, with image display systems described in JP 2012-85159A and JP 2014-71871A (referred to as image communication systems in JP 2012-85159A and JP 2014-71871A), when the user viewing the displayed image moves rightward/leftward, the displayed image switches so as to rotate about a vertical axis as shown in FIG. 14. As a result, the image displayed on the display screen becomes an image having a left portion and a right portion different in a depth distance as shown in FIG. 14. FIG. 14 shows a state where the image changes in association with the movement of the user viewing the display screen in the conventional image display systems (specifically, the image display systems described in JP 2012-85159A and JP 2014-71871A).

As described before, with the image display systems described in JP 2012-85159A and JP 2014-71871A, the depths of portions of the displayed image are changed in response to the movement (movement in the right/left direction) of the view point position of the user viewing the display screen, thereby reproducing an image in a space of the conversation partner viewed from the view point position after the movement.

Incidentally, when the image on the display screen is changed in response to the movement of the view point position of the person viewing the display screen, such processing as modifying the image before the movement of the view point position and the like is necessary. It is surely preferred to carry out this modification processing in a simpler procedure. On the other hand, the image display systems according to JP 2012-85159A and JP 2014-71871A extract an image of a person from the image, apply predetermined processing to the person image, and combine the processed person image and a background image with each other to form the displayed image. In other words, in the image display systems according to JP 2012-85159A and JP 2014-71871A, when the image on the display screen is to be changed in response to the movement of the view point position of the person viewing the display screen, the extraction of the person image is essential, and time is accordingly required for the processing.

Moreover, in the image display systems described in JP 2012-85159A and JP 2014-71871A, the displayed image switches so as to rotate about the vertical axis when the user viewing the display screen moves rightward/leftward as described before. However, when one conversing person out of the persons who are actually facing each other for the conversation moves rightward/leftward, the other conversing person whom the one conversing person is viewing does not rotate as described before, but only horizontally moves.

Further, when the displayed image is changed in response to the movement of the view point position of the user viewing the display screen, it is necessary to consider a difference in the position in a depth direction between the image of the person and the image of the background. However, the image display systems described in JP 2012-85159A and JP 2014-71871A rotate both the image of the person and the image of the background by the same rotation amount (rotation angle) when the user viewing the display screen moves rightward/leftward. Therefore, in the image display systems described in JP 2012-85159A and JP 2014-71871A, the image of the conversation partner when the user viewing the display screen moves rightward/leftward is different from an appearance of the conversation partner when the user actually faces and views the conversation partner (namely, a figure of the conversation partner recognized by the user through the own sense of vision).

Furthermore, in the image display systems according to JP 2012-85159A and JP 2014-71871A, a display size of the image of the conversation partner changes in accordance with the distance (depth distance) of the conversation partner as shown in FIG. 15. Specifically, the display size is optically determined in accordance with characteristics of an imaging device (specifically, characteristics of lenses) for imaging the conversation partner. Therefore, the conversation partner appears in a smaller size in the image as the depth distance of the conversation partner increases (in other words, the conversation partner separates more from the imaging device) as shown in FIG. 15. FIG. 15 shows a state where the image of the conversation partner is displayed in the display size determined in accordance with the depth distance of the conversation partner in the conventional image display systems (specifically, the image display systems described in JP 2012-85159A and JP 2014-71871A).

However, when one conversing person out of the persons actually conversing each other moves in the depth direction, the appearance (size) of the figure of the one conversing person viewed by the other conversing person is felt not to change through the human vision. Therefore, in the image display systems according to JP 2012-85159A and JP 2014-71871A, the display size of the image of the conversation partner when the depth distance changes is different from the size felt when the user actually faces and views the conversation partner (namely, the size of the conversation partner recognized by the user through the own sense of vision).

SUMMARY

The present invention has been made in view of the above-mentioned problems, and therefore has an object to provide an image display system and an image display method capable of easily switching a displayed image when a user viewing an image of a conversation partner displayed on a display moves to an image reflecting a position of the user after the movement.

Moreover, another object of the present invention is to provide an image display system and an image display method capable of displaying, when a user viewing an image of a conversation partner displayed on a display moves, an image reflecting an appearance when the user actually faces the conversation partner.

Moreover, another object of the present invention is to provide an image display system capable of displaying, when a depth distance of a conversation partner changes, an image of the conversation partner in a display size reflecting an appearance when the user actually faces the conversation partner.

The above-described problems are solved by an image display system according to the present invention, which is an image display system for displaying an image of a first user on a display of a second user, including (A) an image acquisition unit that acquires an image of the first user taken by an imaging device and an image of a background taken by the imaging device, (B) a composite image display unit that composes the image of the first user and the image of the background acquired by the image acquisition unit with each other, and displays on the display a composite image in which the first user is positioned in front of the background, and (C) a detection unit that detects a movement of a face of the second user with respect to the display, where, (D) when the detection unit detects the movement of the face, the composite image display unit carries out transition processing of causing the composite image displayed on the display to transition from a state before the detection unit detects the movement of the face.

With the above-mentioned image display system, the image of the first user and the image of the background are acquired, both of the images are composited with each other, and a composite image in which the first user is positioned in front of the background is displayed on the display of the second user. In such a composite image, a display position, a display size, and the like can individually be adjusted for each of the image of the first user and the image of the background. As a result, when the face of the second user moves, the composite image of the first user and the background image can more easily be switched in accordance with the position of the face of the second user after the movement.

Moreover, the composite image display unit preferably causes the composite image to transition to a state where one of a display position of the image of the first user in the composite image and a range included in the composite image out of the image of the background acquired by the image acquisition unit is shifted along a movement direction of the face by a shift amount larger than a shift amount of the other in the transition processing.

With the above-mentioned configuration, a composite image in which one of the display position of the image of the first user and the range included in the composite image out of the image of the background is shifted along the movement direction by the shift amount larger than the shift amount of the other is displayed in the transition processing carried out when the face of the second user moves. As a result, the composite image is an image reproducing the appearance when the second user actually views the first user from the position of the face after the movement, and, thus, sense of presence (sense of reality) of the conversation through the image display system can be increased.

Moreover, in the image display system, two directions, which are directions opposite to each other in a widthwise direction of the display, are set to a first direction and a second direction, and when the detection unit detects that the face moves toward the first direction, the composite image display unit preferably causes the composite image to transition to a state where the range is shifted toward the second direction by a shift amount larger than a shift amount of the display position in the transition processing.

With the above-mentioned configuration, when the face of the second user moves toward the first direction, the composite image in which the display range of the image of the background is shifted toward the second direction by the shift amount larger than the shift amount of the display position of the image of the first user. As a result, when the line of sight of the second user directs to the first user, the displayed image (composite image) when the face of the second user moves can be the image reproducing the appearance when the first user is actually viewed from the position of the face after the movement. It should be noted that this effect is particularly effective in a case in which a range which is not included in the initial composite image out of the image of the background is displayed and the like.

Moreover, in the image display system, two directions, which are directions opposite to each other in a widthwise direction of the display, are set to a first direction and a second direction, and when the detection unit detects that the face moves toward the first direction, the composite image display unit may cause the composite image to transition to a state where the display position is shifted toward the second direction by a shift amount larger than a shift amount of the range in the transition processing.

With the above-mentioned configuration, when the face of the second user moves toward the first direction, the composite image in which the display position of the image of the first user is shifted toward the second direction by the shift amount larger than the shift amount of the display range of the image of the background. As a result, when the line of sight of the second user directs to the background, the displayed image (composite image) when the face of the second user moves can be the image reproducing the appearance when the first user is actually viewed from the position of the face after the movement.

Moreover, in the above-mentioned image display system, provided is a distance identification unit that identifies a distance from a reference surface having a direction extending through the display as a normal direction, when the detection unit detects that the face moves toward the first direction, the composite image display unit more preferably causes the composite image to transition to a state where the display position is shifted toward the second direction by a shift amount corresponding to a distance between the reference surface and the first user identified by the distance identification unit, and the range is shifted toward the second direction by a shift amount corresponding to a distance between the reference surface and the background identified by the distance identification unit in the transition processing.

With the above-mentioned configuration, the display position of the image of the first user and the display range of the image of the background are shifted by the respective shift amounts corresponding to the distance between the display position and the reference surface and the distance between the display range and the reference surface when the face of the second user moves toward the first direction.

As a result, the respective shift amounts of the display position of the image of the first user and the display range of the image of the background can appropriately be set based on a position relationship between the first user and the background.

Moreover, in the above-mentioned image display system, provided is a distance identification unit that identifies a distance from a reference surface having a direction extending through the display as a normal direction, when the position of the first user changes in the normal direction while the imaging device is taking the image of the first user, the composite image display unit further preferably carries out adjustment processing of adjusting a display size of the image of the first user in the composite image so as to be the display size before the position of the first user changes based on the distance between the reference surface and the first user identified by the distance identification unit.

With the above-mentioned configuration, even when the distance (depth distance) between the reference surface and the first user changes, the image of the first user is displayed still in the display size before the change in the composite image. In other words, when the depth distance changes, the composite image after the change is an image in which the image of the first user is displayed in the display size reflecting the size when the first user is actually viewed from the position of the face of the second user after the movement. As a result, the sense of presence (sense of reality) of the conversation through the image display system further increases.

Moreover, in the above-mentioned image display system, the display is installed in a room where the second user is present, and still preferably presents an appearance as furniture or an architectural material while the composite image is not displayed, the furniture or the architectural installed in the room and having a mirror surface portion, and the composite image display unit displays the composite image on the mirror surface portion of the furniture or the architectural material forming the display when the composite image is displayed.

With the above-mentioned configuration, furniture or an architectural material installed in the room constitutes the display, and the composite image is displayed on the mirror surface portion thereof. As a result, such a presentation effect that the spaces where the users are present are connected with each other through glass is provided during the conversation through the image display system, and the sense of presence of the conversation can further be increased.

Moreover, in the above-mentioned image display system, the composite image display unit still more preferably displays on the display the composite image in which at least one of a predetermined design and a figure appears in front of the first user.

With the above-mentioned configuration, the composite image in which a predetermined design or a figure appears in front of the first user is displayed on the mirror surface portion of the display. As a result, the existence of the mirror surface portion is emphasized, and such a presentation effect that the spaces where the users are present are connected with each other through glass is more effectively provided.

Moreover, in the above-mentioned image display system, the image acquisition unit yet more preferably acquires as the image of the background an image of a space corresponding to the background taken by the imaging device when the first user is not present in the space.

With the above-mentioned configuration, the image of the background is acquired at the timing different from the acquisition timing of the image of the first user. As a result, the image of the background can more easily be acquired.

Moreover, the above-described problems are solved by an image display method according to the present invention, which is an image display method of displaying an image of a first user on a display of a second user, including using a computer to perform the steps of: (A) acquiring an image of the first user taken by an imaging device and an image of a background taken by the imaging device, (B) compositing the acquired image of the first user and the acquired image of the background with each other, and displaying on the display a composite image in which the first user is positioned in front of the background, and (C) detecting a state where a face of the second user moves with respect to the display, where, (D) when the movement of the face is detected, the computer carries out transition processing of causing the composite image displayed on the display to transition from a state before the detection of the movement of the face.

With the above-mentioned method, when the face of the second user moves, the composite image of the first user and the background image can more easily be switched in accordance with the position of the face of the second user after the movement.

Moreover, in the above-mentioned image display method, the composite image is preferably caused to transition to a state where one of a display position of the image of the first user in the composite image and a range included in the composite image out of the acquired image of the background is shifted along a movement direction of the face by a shift amount larger than a shift amount of the other in the transition processing.

With the above-mentioned method, an image (composite image) reproducing the appearance when the face of the second user moves, and the first user is actually viewed from the position of the face after the movement can be displayed, and, thus, the sense of presence (sense of reality) of the conversation through the image display method can be increased.

With the image display system and the image display method according to the present invention, when the face of the second user moves, the composite image of the first user and the background image can more easily be switched in accordance with the position of the face of the second user after the movement.

Moreover, with the image display system and the image display method according to the present invention, when the face of the second user moves, the image (composite image) reproducing the appearance when the first user is actually viewed from the position of the face after the movement can be displayed.

Further, with the image display system according to the present invention, when the distance (depth distance) between the reference surface and the first user changes, the image of the first user in the composite image is displayed still in the display size before the change in the depth distance.

With the above-mentioned actions, when the position of the face of the second user and a standing position of the first user change, the composite image after the changes can be an image reflecting the appearances when the users actually face each other. As a result, the sense of presence (sense of reality) of the conversation can be increased.

BRIEF DESCRIPTION OF THE DRAWINGS

FIG. 5 is an explanatory diagram of a procedure of extraction of a person image from an actual image;

FIG. 6 functionally shows a configuration of a home server owned by each user;

FIG. 8A shows a composite image before the transition processing, and FIG. 8B shows a composite image after the transition processing;

FIG. 9A shows a composite image before the adjustment processing, and FIG. 9B shows a composite image after the adjustment processing;

FIG. 12A shows a composite image before the transition processing, and FIG. 12B shows a composite image after the transition processing;

FIGS. 13A to 13D show variations of a gimmick image;

DETAILED DESCRIPTION OF THE EMBODIMENTS

Hereinafter, a description will be given of an embodiment (this embodiment) of the present invention referring to drawings. The image display system (hereinafter referred to as this system S) of this embodiment is used for conversation between users in rooms remote to each other while viewing figures (images). More specifically, each user feels such a sense that as if the user were meeting and talking with the conversation partner through visual effect brought about by this system S.

It should be noted that it is assumed that this system S is used when each user is at home. In other words, this system S is used to carry out conversation (pseudo face-to-face conversation, hereinafter simply referred to as "face-to-face conversation") with a conversation partner while each user is at home. It should be noted that the usage of this system S is not limited to this case, and may be used when the user is in a place such as assembly facilities, commercial facilities, public facilities such as class rooms of schools, tutoring schools, hospitals, and the like, companies, offices, and the like other than home. Moreover, this system S may be used for the face-to-face conversation between persons in rooms remote from each other in the same building.

Hereinafter, for the sake of a clear description of this system S, a description will be given of a case in which it is assumed that two users use this system S for the face-to-face conversation, for example, one user is a person A, and the other user is a person B. Moreover, hereinafter, a description will be given of a configuration of this system S and the like from a view point of the person B, in other words, in a stand point of viewing the image of the person A. In other words, the person A corresponds to a "first user", and the person B corresponds to a "second user". It should be noted that the "first user" and the "second user" are relative concepts, which are switched in accordance with a relationship of a person viewing an image and a person whose image is viewed. Thus, if the view point of the person A is set as a reference, the person B corresponds to "first user", and the person A corresponds to "second user".

<<Basic Configuration of this System>>

A description will first be given of a basic configuration of this system S. This system S is used for the face-to-face conversation while the two users (namely the person A and the person B) are viewing an image of the conversation partner, is more specifically configured to display the image in the life size of the conversation partner for each other, and reproduce voice of the conversation partner. In order to acquire this visual and audio effect, each user owned a communication unit 100. In other words, this system S is constructed by communication units 100 each owned by each user.

Figure 1:
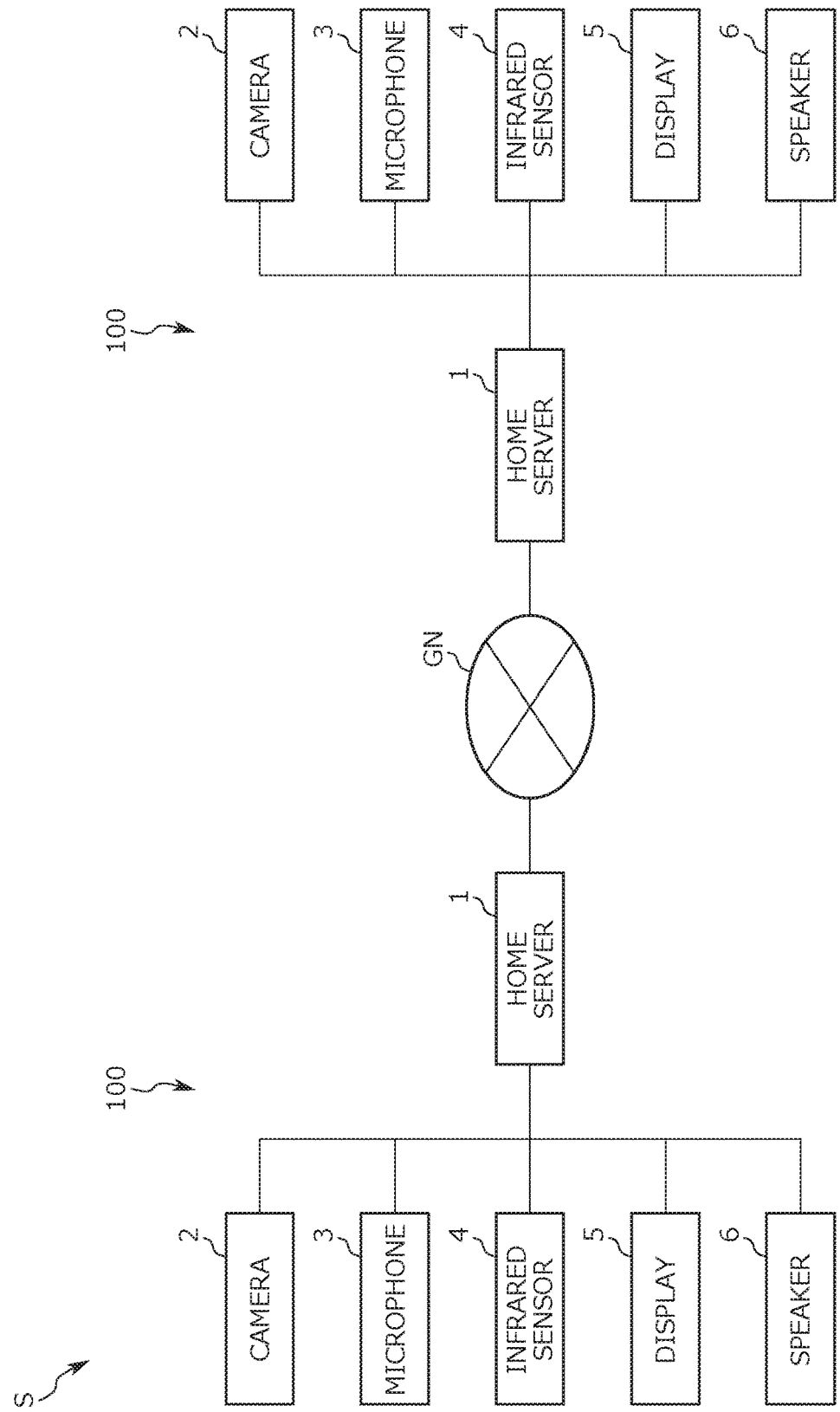
FIG. 1 is a diagram of a configuration of an image display system according to an embodiment of the present invention.

A description will now be given of a configuration of the communication unit 100 referring to FIG. 1. FIG. 1 is a diagram of a configuration of this system S, more specifically the configuration of each communication unit 100. Each communication unit 100 includes a home server 1, a camera 2 serving as an imaging device, a microphone 3 serving as a sound collection device, an infrared sensor 4, a display 5 serving as an image display, and a speaker 6 as main component devices. Out of these devices, the camera 2, the microphone 3, the infrared sensor 4, the display 5, and the speaker 6 are arranged in a predetermined room (for example, a room used for the face-to-face conversation) of home of each user.

The home server 1 is a device constituting a core of this system S, and is a computer, specifically a server computer constituting a home gateway. The configuration of the home server 1 is publicly known, and is constructed by a CPU, a memory such as a ROM and a RAM, a communication interface, a hard disk drive, and the like.

Moreover, a program for carrying out data processing required for realizing the face-to-face conversation (hereinafter referred to as program for conversation) is installed on the home server 1. A program for generating/displaying image is built into this program for conversation. This program for image generation/display is a program for editing an image acquired from the home server 1 of the conversation partner side, thereby rebuilding the edited image as a new image. In more detail, the above-mentioned program for image generation/display is a program for rendering, and serves to compose the multiple images so that the images are displayed at different positions in a depth direction (normal direction to the display screen). It should be noted that, as the program for image generation/display, a known program capable of embedding an image at any desired position in a virtual 3D space for display can be used.

Moreover, the home server 1 is connected to a communication device in a state where communication is available via an external communication network GN such as the Internet. In other words, the home server 1 belonging to the communication unit 100 owned by the person A communicates with the home server 1 belonging to the communication unit 100 owned by the person B via the external communication network GN, and various data is transmitted and received between both the servers. It should be noted that the data transmitted and received between the home servers 1 is data required for the face-to-face conversation, and is, for example, image data of representing the image of each user and sound data representing the sound of each user.

The camera 2 is a publicly known network camera, and takes an image of a subject in an imaging range (view angle). On this occasion, though "image" is constructed by a set of multiple consecutive frame images, it is assumed that the image hereinafter includes each frame image in addition to a set of frame images. Moreover, according to this embodiment, the imaging range of the camera 2 is fixed. Therefore, the camera 2 is configured to always take an image of a predetermined area of a space in which the camera 2 is installed.

The camera 2 outputs a signal (image signal) representing the taken image to the home server 1 belonging to the same unit as the communication unit 100 to which the camera 2 belongs. It should be noted that though the number of installations of the cameras 2 is not particularly restricted, it is assumed that each communication unit 100 includes only one camera 2 in consideration of the cost according to this embodiment.

Figure 2:
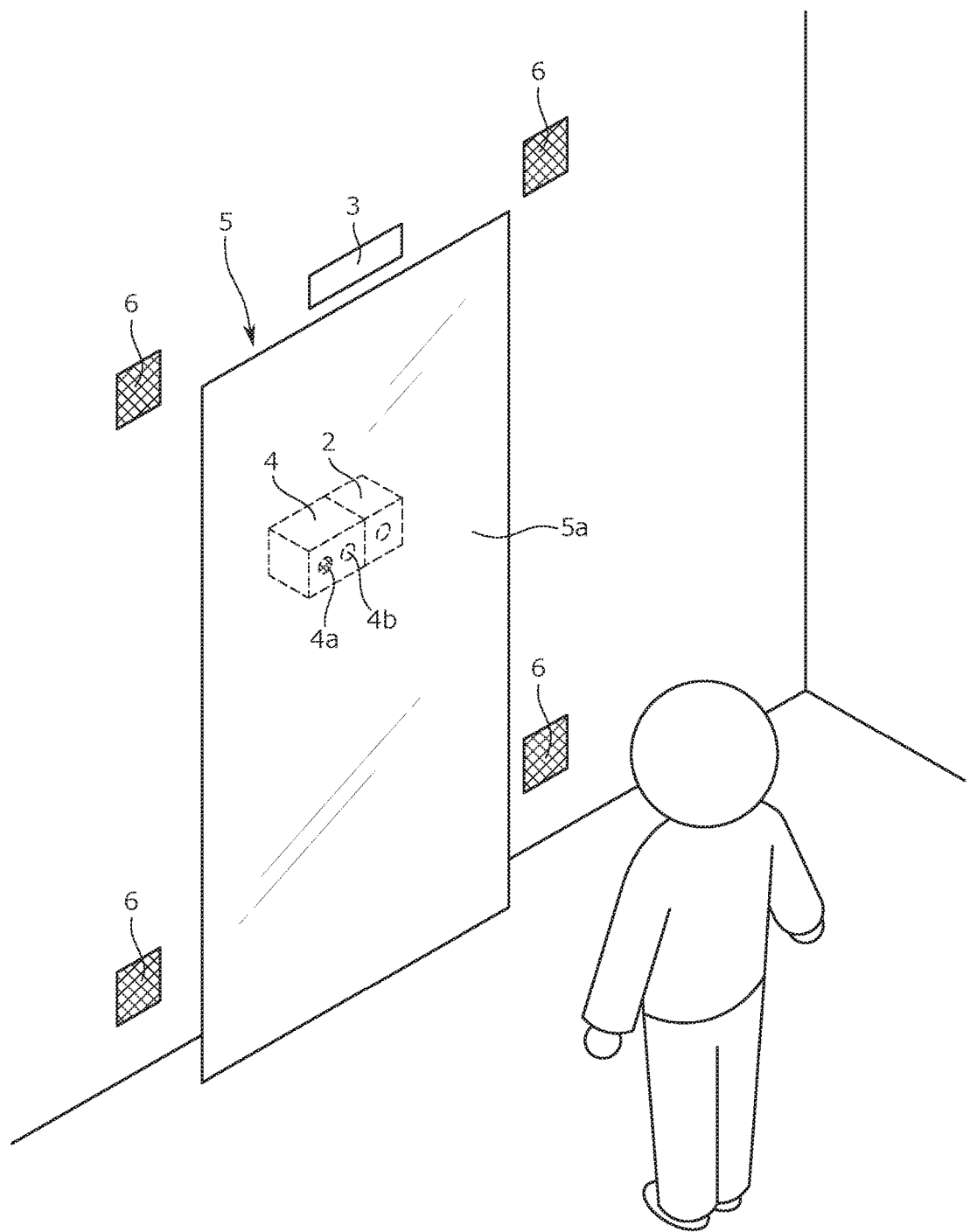
FIG. 2 is a diagram of arrangement positions of system component devices installed in a room of each user.

Moreover, a lens of the camera 2 faces a forming surface of the display screen of the display 5 according to this embodiment. On this occasion, a panel (which is a touch panel 5a in a strict sense, and corresponds to the mirror surface portion) of the display 5 constructing the forming surface is constructed by transparent glass. Thus, the camera 2 is configured to take an image of a subject positioned in front of the panel through the panel as shown in FIG. 2. FIG. 2 is a diagram of arrangement positions of various devices arranged in each of the rooms of the person A and the person B as components of this system S. It should be noted that the arrangement position of the camera 2 may be a position separated from the display 5.

The microphone 3 collects sound in the room in which the microphone 3 is installed, and outputs a sound signal thereof to the home server 1 (home server 1 belonging to the same unit as the communication unit 100 to which the microphone 3 belongs in a strict sense). It should be noted that the microphone 3 is installed at a position immediately above the display 5 according to this embodiment, as shown in FIG. 2.

The infrared sensor 4 is a so-called depth sensor, and is a sensor for measuring the depth of a measurement subject by means of the infrared. Specifically, the infrared sensor 4 radiates infrared from a light emission unit 4a toward the measurement subject, and receives reflected light thereof on a light reception unit 4b, thereby measuring the depth. On this occasion, the depth is a distance (namely, a depth distance) from the reference surface to the measurement subject. Incidentally, the forming surface of the display screen of the display 5 corresponds to the reference surface in this system S. More specifically, the light emission unit 4a and the light reception unit 4b of the infrared sensor 4 face the forming surface of the display screen in the display 5. Additionally, a film that can transmit the infrared is put on a portion immediately in front of the infrared sensor 4 out of the touch panel 5a of the display 5 constructing the forming surface. The infrared radiated from the light emission unit 4a, and subsequently reflected by the measurement subject transmits through the film, and is then received by the light reception unit 4b, In other words, the infrared sensor 4 is configured to measure, as the depth, the distance between the surface of the touch panel 5a and the measurement subject, or a distance in the normal direction to the surface of the touch panel 5a (namely, the direction extending through the display 5) in a more strict sense.

It should be noted that the image taken by the camera 2 is divided into the predetermined number of image pieces (pixels), and the measurement result of the depth is acquired for each pixel in this system S. Then, the measurement results of the depth acquired for pixels are assembled for an image as a unit, resulting in depth data on the image. This depth data defines the measurement result of the infrared sensor 4, namely the depth for each pixel of the taken image (each frame image in a strict sense) by the camera 2. A supplementary description will now be given of the depth data. As described later referring to FIG. 5, a pixel belonging to an image of a background (a pixel belonging to a black portion in the diagram) and a pixel belonging to an image in front thereof (a pixel belonging to a white portion and pixels belonging to an oblique-line hatching in the diagram) are apparently different in a depth value from each other.

An image of a person can be extracted from the image through the use of the depth data as described before. It should be noted that a description will later be given of a method for extracting the person image through the use of depth data. Moreover, the position of a person (subject of the camera 2) can be identified from the depth data, namely the measurement result of the infrared sensor 4 in this system S. It should be noted that the configuration for identifying the position is not limited to this example, and a sensor for the position detection may be installed independently of the infrared sensor 4, and the position of the person may be identified from a detection result of the sensor for the position detection, for example.

The speaker 6 is configured to generate sound (reproduced sound) reproduced by expanding the sound date by the home server 1, and is constructed by a publicly-known speaker. It should be noted that a plurality (four in FIG. 2) of speakers 6 are installed at positions on both sides of the display 5 in a widthwise direction of the display 5 as shown in FIG. 2 according to this embodiment.

The display 5 is configured to form the display screen of the image. Specifically, the display 5 includes a panel constructed by the transparent glass, and forms the display screen on a front surface of the panel. It should be noted that the above-mentioned panel corresponds to the touch panel 5a, and receives an operation (touch operation) carried out by the user in this system S.

Further, the panel has a size sufficient for displaying an image of the whole body of the human. Then, the whole-body image of the conversation partner is displayed in the life size on the display screen formed on the front surface of the panel in the face-to-face conversation in this system S. In other words, the whole-body image of the person A can be displayed in the life size on the display 5 of the person B. As a result, the person B viewing the display screen feels such a sense that as if the person B were meeting the person A, particularly such a sense that the person B were meeting the person A face to face through the glass.

Figure 3B:
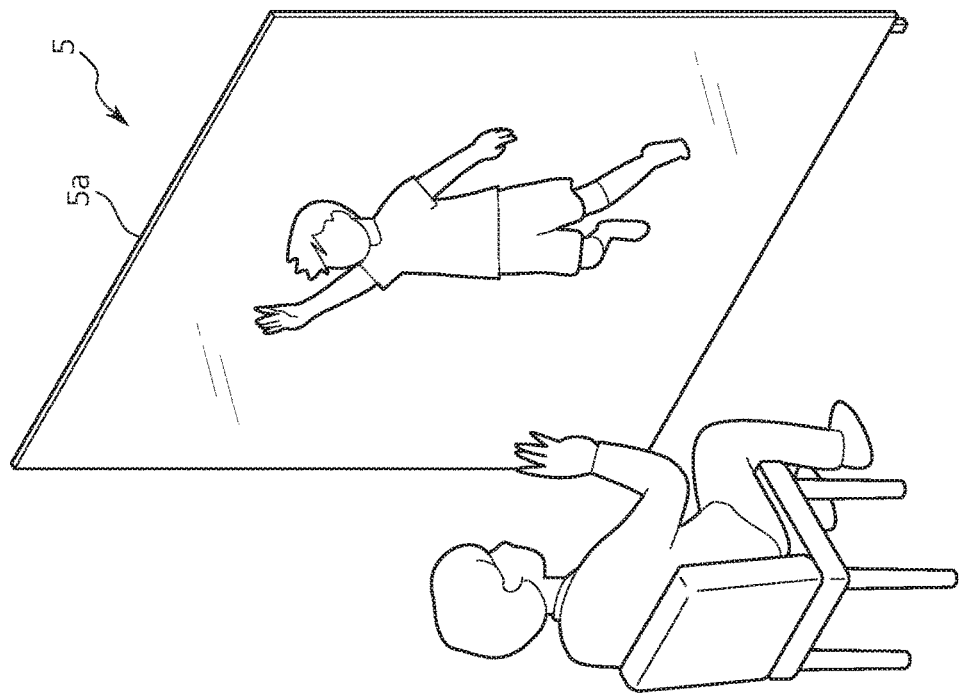
FIGS. 3A and 3B are a diagram showing one example of a display according to the present invention.
Figure 3A:
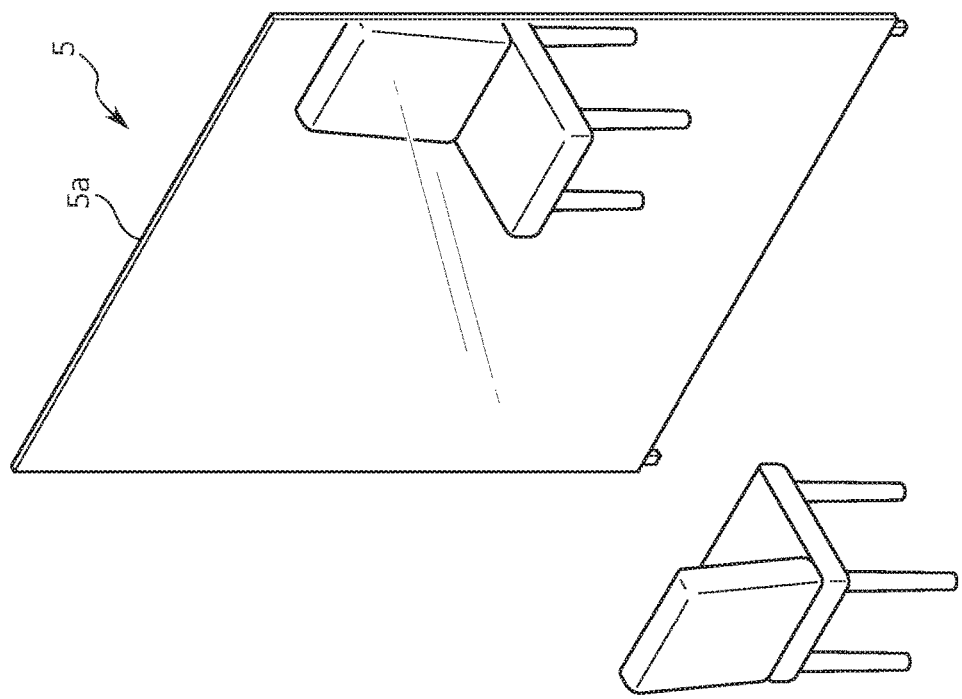

Furthermore, the display 5 of this system S is configured to usually function as furniture arranged in the room, specifically full length mirror, and form the display screen only during the face-to-face conversation period. A detailed description will now be given of a configuration of the display 5 referring to FIGS. 3A and 3B. Diagrams of FIGS. 3A and 3B show configuration examples of the display 5 used in this system S, FIG. 3A shows a state of non-conversation, and FIG. 3B shows the state of the face-to-face conversation.

The touch panel 5a belonging to the display 5 constructs a part of the full-length mirror arranged in the room in which the face-to-face conversation is carried out, specifically the mirror surface portion. Then, the touch panel 5a does not form the display screen during the non-conversation period in which the conversation is not being carried out, namely the period in which the image is not displayed as shown in FIG. 3A. In other words, the display 5 of this system S presents an appearance as the full length mirror in the non-conversation period. On the other hand, when the face-to-face conversation starts, the touch panel 5a forms the display screen on the front surface thereof. As a result, the display 5 is configured to display the image of the conversation partner and the background thereof on the front surface of the touch panel 5a as shown in FIG. 3B.

Incidentally, the display screen is switched to be turned on/off by the home server 1 in accordance with the measurement result of the infrared sensor 4. More specifically, when the user stands at a front position of the display 5 in order to start the face-to-face conversation, the camera 2 takes an image including the user, and the infrared sensor 4 simultaneously measures the depths. As a result, the above-mentioned depth data on the image is acquired, the home server 1 identifies the distance (depth distance) between the user and the touch panel 5a based on the depth data. Then, when the depth distance becomes smaller than a predetermined distance, the home server 1 controls the display 5 to form the display screen on the front surface of the touch panel 5a. As a result, the touch panel 5a of the display 5, which has been functioning as the full length mirror, comes to function as the screen for displaying the image.

Conversely, when the depth distance becomes equal to or larger than the predetermined distance, the home server 1 controls the display 5 to turn off the display screen that has been formed up to that time point. As a result, the display 5 again comes to function as the full length mirror.

As described before, the display 5 is used as the full length mirror in the non-conversation period in this system S. As a result, the existence of the display screen becomes less likely noticeable during the non-conversation period. On the other hand, the display screen is formed during the face-to-face conversation period, the image of the conversation partner comes to be displayed, and the user feels such a visual presentation effect that as if the user were conversing with the conversation partner through the glass.

It should be noted that a publicly known configuration such as a configuration described in WO2009/122716A1 can be used as a configuration that serves both as the image display screen and the full length mirror. Moreover, the display 5 is not limited to such a configuration that the display 5 is also used as the full length mirror. The device used as the display 5 only needs to have a size sufficient for displaying the whole-body image of the conversation partner. Then, from such a view point that the existence of the display screen is less likely noticeable during the non-conversation period, one that is furniture or an architectural material installed in the room for the face-to-face conversation, and has a mirror surface portion is preferable, and a door (glass door) or a window (glass window), for example, may be used as the display 5. It should be noted that the display 5 is not limited to the one also used as an architectural material such as a door or a window or furniture such as full length mirror, and may be an ordinary display that always forms the display screen during the activation.

<<Image Composition>>

Figure 4:
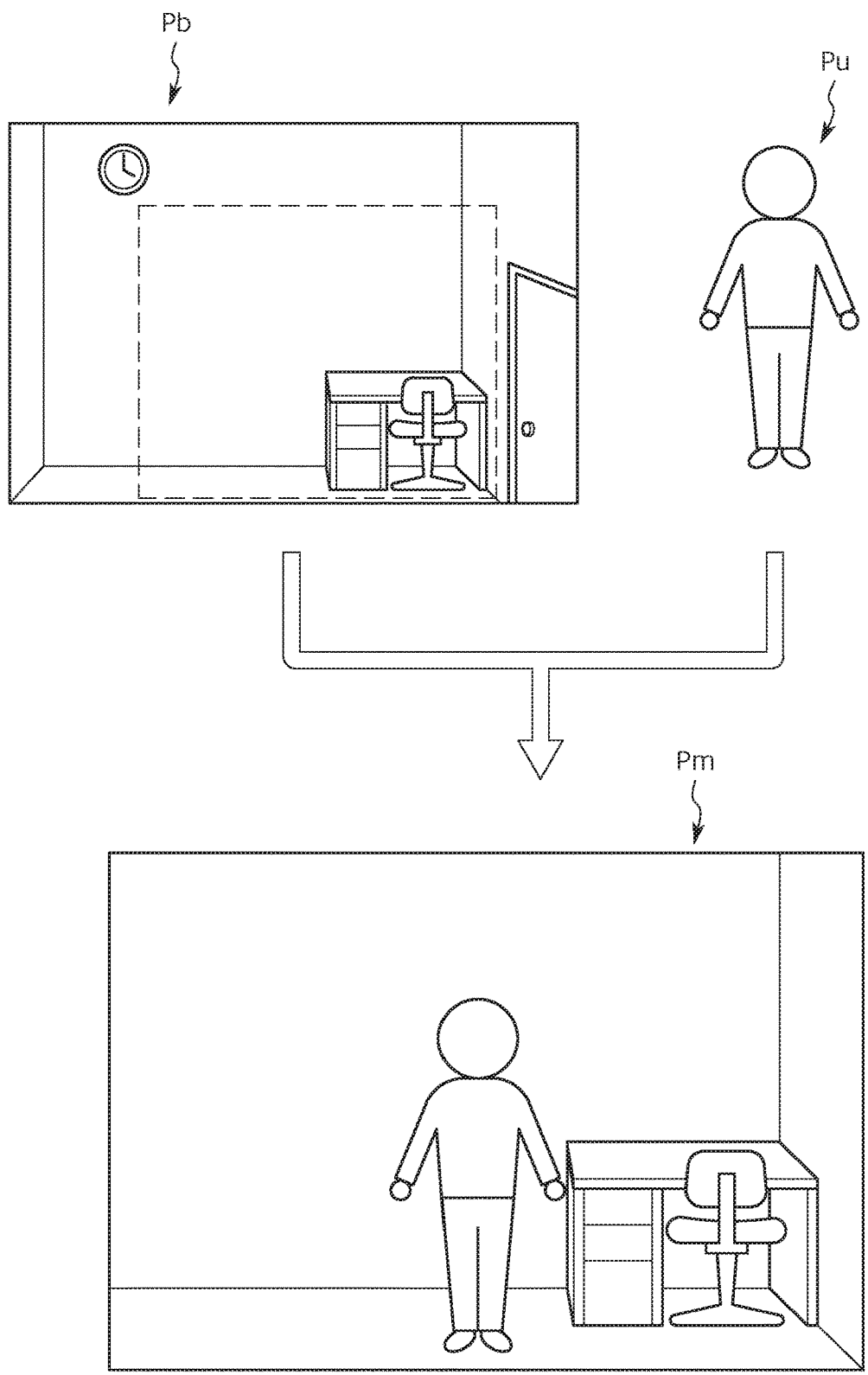
FIG. 4 is an explanatory diagram of a procedure of image composition.

The image of the person A and the image of the background thereof are displayed on the display 5 of the person B, and the image of the person B and the image of the background thereof are displayed on the display 5 of the person A during the face-to-face conversation through this system S. On this occasion, the person image and the background image displayed on each display 5 are not simultaneously taken by the camera 2, and are image taken at timings different from each other. In other words, the composite image acquired by compositing the person image and the background image taken at the timings different from each other with each other is to be displayed on each display 5. A brief description will now be given of a procedure of the image composition referring to FIG. 4. FIG. 4 is an explanatory diagram of the procedure of the image composition. It should be noted that a description will now be given of a case in which the image of the person A and the background image are composited with each other as a specific example.

The background image (denoted by numeral Pb in FIG. 4) out of the composite image is an image of an area in the imaging range of the camera 2 out of the room used when the person A carries out the face-to-face conversation. Then, the camera 2 is configured to take the background image when the person A is not in the room according to this embodiment.

On the other hand, the person image (specifically, the image of the person A denoted by reference numeral Pu in FIG. 4) is taken when the person A is in the room, in a strict sense, in the imaging range of the camera 2. On this occasion, the image (hereinafter referred to as actual image) taken by the camera 2 includes the image of the background in addition to the person image. Therefore, the person image is to be extracted from the actual image according to this embodiment. A method of extracting the person image from the actual image is not particularly restricted, and a method of extracting the person image based on the above-mentioned depth data may be mentioned as an example. A description will now be given of the method for extracting the person image through the use of the depth data referring to FIG. 5. FIG. 5 is an explanatory diagram of a procedure of the extraction of the person image from the taken image. It should be noted pixels constructing the depth data is coarser than actual pixels for the sake of illustration in FIG. 5.

The infrared sensor 4 measures the depths of measurement subjects in the view angle of the camera 2 during the period in which the camera 2 takes the image. As a result, the depth data on the actual image is acquired. The depth data on the actual image defines the measurement result of the infrared sensor 4, namely the depth for each pixel when the frame image constructing the actual image is divided into a predetermined number of pixels. It should be noted that, in the depth data of the actual image as shown in FIG. 5, the pixels belonging to the person image (the pixels belonging to the white portion in FIG. 5) and the pixels belonging to the images other than the person image (the pixels belonging to the black portion and the pixels belonging to the oblique-line hatching in FIG. 5) are apparently different from each other in the depth.

Then, a skeleton model of the person A is identified based on the depth data and the taken image of the camera 2 (information for identifying the position of the image of the face of the person A in the taken image in a strict sense). The skeleton model simply models position information on the skeleton (specifically the head, the shoulders, the elbows, the wrists, a center of the torso, the loin, the knees, and the ankles out of the body) of the person A as shown in FIG. 5. It should be noted that a publicly known method can be used as a method of acquiring the skeleton model, and the same method as those employed in the inventions described in JP 2014-155693A and JP 2013-116311A, for example, may be used.

Then, after the skeleton model is identified, the person image is extracted from the actual image based on the skeleton model. Though a description is not given of details of a technique of extracting the person image from the actual image based on the skeleton model herein, a description will now be given of a rough procedure. A pixel group belonging to the person image of the person A is identified from the depth data based on the identified skeleton model. Then, an area corresponding to the identified pixel group is extracted from the actual image. The image extracted through this procedure corresponds to the person image of the person A in the actual image.

After the person image is extracted from the actual image through the above-mentioned procedure, the background image and the person image are composited with each other. Specifically, an image to be actually displayed on the display 5 (a range enclosed by a broken line in FIG. 4, hereinafter referred to as display range) out of the background image taken by the camera 2 is set. On this occasion, the display range corresponds to a portion included in the composite image out of the background image taken by the camera 2. It should be noted that the size of the display range is determined in accordance with the size of the display 5. Moreover, an initial (default) display range is set to a center portion of the background image according to this embodiment. It should be noted that the initial display range is not particularly restricted, and may be a portion other than the center portion of the background image.

Then, the composite image is acquired by compositing the display range in the background image and the extracted person image with each other. As a result, as shown in FIG. 4, an image (denoted by reference numeral Pm in FIG. 4) in which the person A is positioned in front of the background comes to be displayed on the display 5 of the person B.

It should be noted that a series of steps relating to the image composition (steps of compositing the image of the person A and the background image with each other in a strict sense) is carried out by the home server 1 on the person B aide, and is specifically carried out by executing the above-mentioned program for rendering. It should be noted that the configuration is not limited to this example, and the series of steps relating to the image composition may be carried out by the home server 1 of the person A.

The composite image is displayed as the displayed image on the display 5 according to this embodiment as described before. Then, with the configuration of displaying the composite image, the display position, the display size, and the like can individually be adjusted for each of the person image and the background image. Specifically, for example, the display size of the image of the person A, which is the person image, can be adjusted without changing the display size of the background image. It should be noted that the display size of the image of the person A is adjusted so as to match the actual size (life size) of the person A according to this embodiment. As a result, the image of the person A is displayed on the display 5 of the person B, and the sense of presence (sense of reality) of the face-to-face conversation through this system S further increases.

It should be noted that the display size of the person image is not limited to the life size. Incidentally, the life size means a size when the person image is taken while the person is at the position in front of the camera 2, and separated from the camera 2 by a predetermined distance (specifically, a distance d1 in FIG. 7B described later, and hereinafter referred to as reference distance), and is displayed in the original size. Moreover, the reference distance d1 is set in advance, and is stored in the memory of the home server 1.

<<Functions of Home Server>>

A description will now be given of functions of the home server 1, particularly of functions relating to image display processing. It should be noted that both the home server 1 of the person A and the home server 1 of the person B have the same functions, and carry out bidirectional communication, thereby carrying out the same data processing when the face-to-face conversation is to be carried out. Therefore, a description will now be given of the functions of only one of the home servers 1 (such as the home server 1 of the person B).

The home server 1 presents the functions as the home server 1 by the CPU of this device executing the program for the conversation, and specifically carries out a series of data processing relating to the face-to-face conversation. A description will now be given of a configuration of the home server 1 in terms of the functions thereof, particularly an image display function referring to FIG. 6. FIG. 6 is a diagram of the configuration of the home server 1 in terms of the functions.

The home server 1 includes a data transmission unit 11, a data reception unit 12, a background image storage unit 13, a person image extraction unit 14, a skeleton model storage unit 15, a composite image display unit 16, a detection unit 17, and a distance identification unit 18 as shown in FIG. 6. These data processing units are realized by the hardware devices (specifically the CPU, the memory, the communication interface, the hard disk drive, and the like) of the home server 1 cooperating with the program for conversation as software. A description will now individually be given of the data processing units.

The data transmission unit 11 digitizes a signal of the image taken by the camera 2 of the person B, and transmits the digitized signal as the image data to the home server 1 of the person A. On this occasion, types of the image data transmitted by the data transmission unit 11 classified into two types. One is the image data on the background image, and is specifically data representing an image of the room corresponding to the background taken when the person B is not in the room (image of the area in the imaging range of the camera 2 in a strict sense). The other is image data on the actual image, and is data representing the image taken when the person B is in the room, more specifically the image of the person B and the background thereof.

Moreover, the data transmission unit 11 generates the depth data on the actual image based on the measurement result of the infrared sensor 4 when the image data on the actual image is to be transmitted, and transmits the depth data together with the image data on the actual image. The depth data is used to extract the person image (specifically the image of the person B) from the actual image as described before. Moreover, the depth data is also used to identify the distance between the person B and the display screen of the display 5 (front surface of the touch panel 5*a* in a strict sense), namely the depth distance.

The data reception unit 12 is configured to receive various data transmitted from the home server 1 of the person A. Data received by the data reception unit 12 includes the image data on the background image, the image data on the actual image, and the depth data on the actual image. On this occasion, the image data on the background image received by the data reception unit 12 is the data representing the image of the room corresponding to the background taken when the person A is not in the room. The data reception unit 12 receives the image data on the background, thereby acquiring the image of the background taken by the camera 2 of the person A in this way. The data reception unit 12 can be considered to correspond to an image acquisition unit in this sense.

Moreover, the image data on the actual image received by the data reception unit 12 is the data on the image of the person A and the background taken when the person A is in the room. Moreover, the depth data on the actual image received by the data reception unit 12 defines the depth of each of the pixels constructing the actual image including the image of the person A. The depth data is used to extract the image of the person A from the actual image, and is used to identify the distance (depth distance) between the person A and the display screen of the display 5.

The background image storage unit 13 is configured to store the image data on the background image received by the data reception unit 12. The person image extraction unit 14 is configured to expand the image data on the actual image received by the data reception unit 12, and extract the person image (namely the image of the person A) from the actual image. The skeleton model storage unit 15 is configured to store the skeleton model (specifically the skeleton model of the person A) referred to when the person image extraction unit 14 extracts the person image.

It should be noted that, the person image extraction unit 14 expand the depth data on the actual image received by the data reception unit 12, and identifies the skeleton model of the person A from the depth data and the taken image of the camera 2 when the image of the person A is to be extracted from the actual image. Then, the person image extraction unit 14 extracts the image of the person A from the actual image based on the identified skeleton model. As described before, the person image extraction unit 14 extracts the person image from the actual image, thereby acquiring the image of the person A taken by the camera 2 of the person A. The person image extraction unit 14 can be considered to correspond to the image acquisition unit in this sense.

The composite image display unit 16 composes the background image stored in the background image storage unit 13 and the person image (image of the person A) extracted by the person image extraction unit 14 with each other, and displays the composite image on the display 5 of the person B. It should be noted that the background image subject to the image composition by the composite image display unit 16 out of the background image stored in the background image storage unit 13 is the background image taken last. Moreover, the composite image display unit 16 selects the image to be included in the composite image from the latest background image read from the background image storage unit 13, namely the display range. Then, the composite image display unit 16 displays the composite image in which the person A is positioned in front of the selected display range on the display 5 of the person B.

The detection unit 17 detects presence/absence of a lateral movement of the face of the person B from the depth data on the actual image (depth data on the actual image taken by the camera 2 of the person B) generated based on the measurement result of the infrared sensor 4. Specifically, the detection unit 17 identifies a pixel group corresponding to the image of the person B from the depth data, and monitors a change in the position of this pixel group during a period in which the composite image display unit 16 is displaying the composite image on the display 5. Then, when the detection unit 17 recognizes a change in the position of the pixel group, the detection unit 17 detects a lateral movement of the face of the person B. It should be noted that the lateral movement is a movement of the face of the person B in a right/left direction (widthwise direction of the display 5) with respect to the display 5 of the person B.

The distance identification unit 18 identifies the distance (depth distance) between the person A and the display screen of the display 5 from the depth data on the actual image received by the data reception unit 12. Then, the distance identification unit 18 is monitoring the depth distance during the period in which the composite image display unit 16 is displaying the composite image on the display 5 (in other words, during the period in which the camera 2 of the person A is taking the image of the person A), and recognizes a change in the depth distance when the depth distance changes.

Incidentally, when the detection unit 17 detects a lateral movement of the face of the person B, or the distance identification unit 18 detects a change in the depth distance of the person A during the period in which the composite image is being displayed on the display 5, the displayed image is reconstructed (in other words, the person image and the background image are again composited with each other) in this system S. A description will now be given of the case in which a lateral movement of the face of the person B is detected and the case in which a change in the depth distance of the person A is recognized.

<Case in which Lateral Movement of Face of Person B is Detected>

Figure 7A:
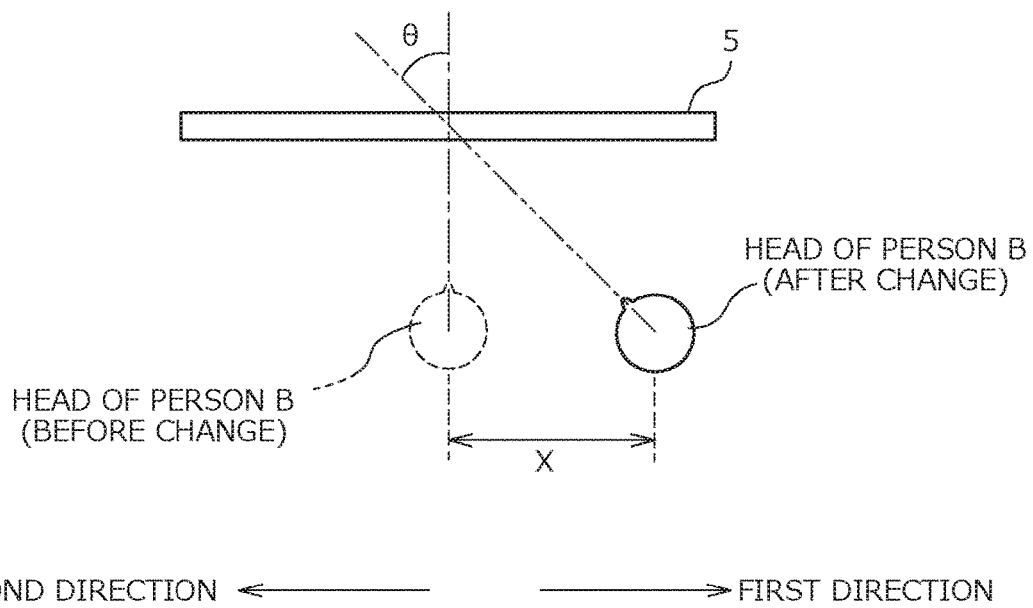
FIG. 7A is a schematic diagram of a state where the face of a second user moves.

A case in which the person B who is initially standing approximately at the center position of the display 5 laterally moves as shown in FIG. 7A is assumed in this case. FIG. 7A is a diagram for schematically showing a state where the face of the person B has laterally moved. It should be noted that one of two directions opposite to each other in the widthwise direction (namely the right/left direction) of the display 5 is referred to as "first direction", and the other direction is referred to as "second direction" hereinafter. On this occasion, a relationship between the first direction and the second direction is relative, and if one direction in the right/left direction set as the first direction, the other direction is the second direction. Thus, if the left direction is set to the first direction when the display 5 is viewed from the front, the right direction is the second direction. Conversely, when the right direction is set as the first direction, the left direction is the second direction.

When the detection unit 17 detects the lateral movement of the face of the person B, the detection unit 17 detects the direction and a movement amount thereof simultaneously. Then, when the detection unit 17 detects that the face of the person B moves toward the first direction by a movement amount X, the composite image display unit 16 carries out transition processing in accordance with the detection result of the detection unit 17. The transition processing is processing of causing the composite image displayed on the display 5 of the person B to transition from a state before the detection unit 17 detects the lateral movement of the face of the person B. Specifically, the composite image is caused to transition to a state where both the display position of the person A in the composite image and the range (namely the display range) included in the composite image out of the latest background image stored in the background image storage unit 13 are shifted in the right/left direction.

Figure 7B:
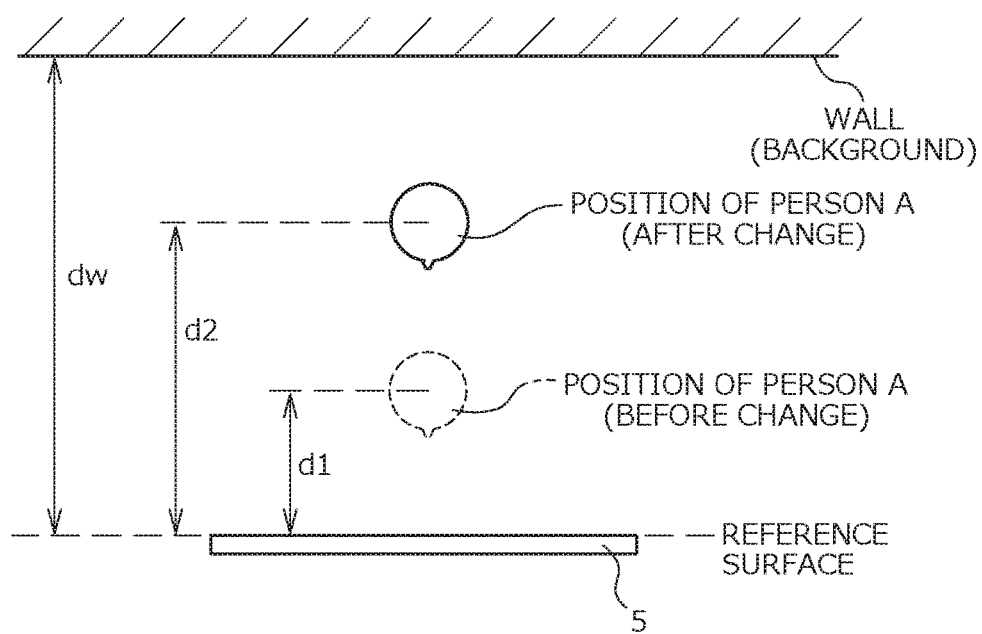
FIG. 7B is an explanatory diagram of respective depth distances of the first user and the background.

A detailed description will now be given of the transition processing. First, the composite image display unit 16 sets the respective shift amounts for the display position of the image of the person A and the display range of the background image in this processing. The shift amounts are set in accordance with the movement amount X of the face of the person B and the distance (depth distance) from the display screen of the display 5 of the person A, which is the reference surface. A specific description will now be given of the setting of the shift amounts referring to FIG. 7A and FIG. 7B described before. FIG. 7B is an explanatory diagram of respective depth distances of the person A and the background.

The movement amount X of the person B is to be converted to a movement angle in order to set the shift amounts. On this occasion, the movement angle is a change amount in the line of sight of the person B expressed in angle. Specifically, the line of sight is a virtual line directing from a center position between both the eyes of the person B to the center of the display 5. Referring to FIG. 7A, a line represented as a long dashed short dashed line corresponds to the line of sight before the face of the person B moves and a line represented as a long dashed double-short dashed line corresponds to the line of sight after the movement. Then, an acute angle formed by both the lines of sight, namely an angle θ in FIG. 7A corresponds to the movement angle. It should be noted that the line of sight before the face of the person B moves is a line along the normal direction to the display screen of the display 5 as shown in FIG. 7A in this case.

Moreover, the respective depth distances of the person A and the background (such as a wall) need to be identified in order to set the shift amounts. The standing position of the person A is maintained at a predetermined position, specifically, the position separated from the display screen of the display 5 of the person A by the reference distance d1 as shown in FIG. 7B during the face-to-face conversation in this case. On the other hand, the depth distance of the wall of the room, which is the background, is a distance dw from the display screen of the display 5 of the person A as shown in FIG. 7B. It should be understood that this distance dw is a distance larger than the reference distance d1, which is the depth distance of the person A.

When the movement angle θ and the respective depth distances d1 and dw of the person A and the background are identified, the composite image display unit 16 sets the respective shift amounts for the display position of the image of the person A and the display range of the background image in the composite image. Specifically, if the shift amount of the display position of the image of the person A is denoted by t1, the shift amount t1 is calculated in accordance with Formula 1

$$t1 = d1 \times \sin \theta \qquad \text{Formula 1}$$

Similarly, if the shift amount of the display range of the background image is t2, the shift amount t2 is calculated in accordance with Formula 2.

$$t2 = dw \times \sin \theta \qquad \text{Formula 2}$$

Figure 8A:
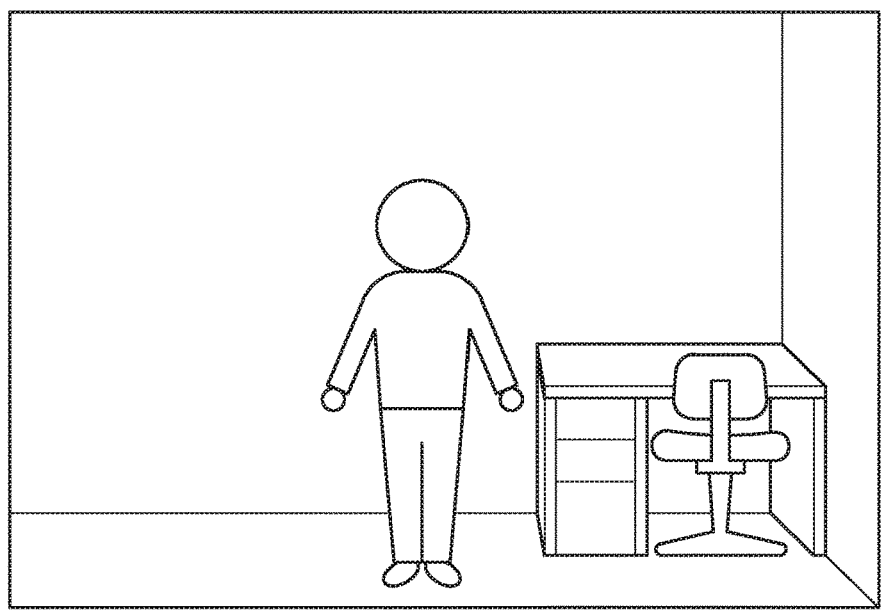
FIGS. 8A and 8B show explanatory diagrams of a change in a composite image when transition processing is carried out.
Figure 8B:
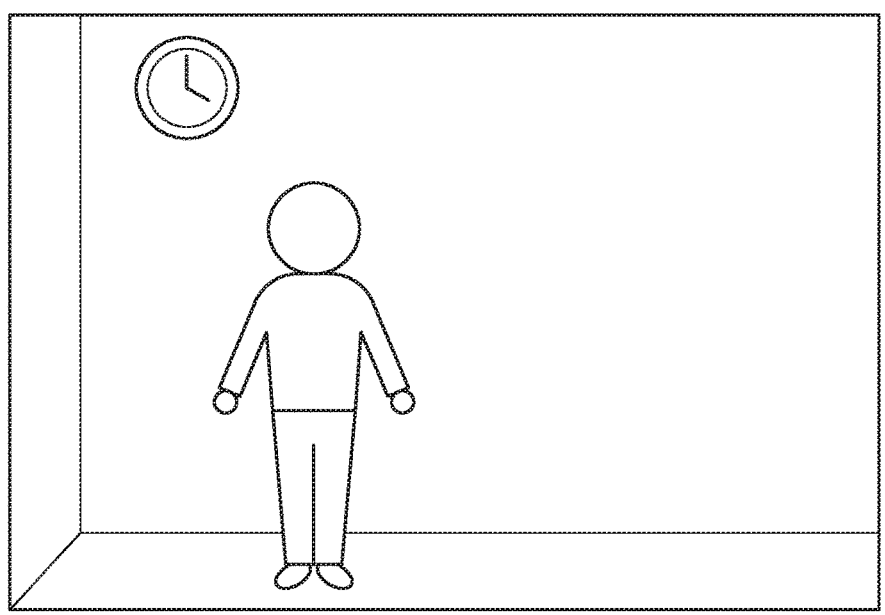

After the shift amounts t1 and t2 are set, the composite image display unit 16 causes the composite image to transition to a state where the display position of the image of the person A and the display range of the background image are respectively shifted by the shift amount t1 and the shift amount t2 toward the second direction. As a result, a composite image shown in FIG. 8A is initially displayed on the display 5 of the person B, and the composite image gradually transitions to the state shown in FIG. 8B in association with the lateral movement of the face of the person B. FIGS. 8A and 8B shows explanatory diagrams of the change in the composite image when the transition processing is carried out, FIG. 8A shows the composite image before the transition processing, and FIG. 8B shows the composite image after the transition processing.

As described before, when the face of the person B moves toward the first direction during the period in which the composite image is being displayed on the display 5 of the person B, both the display position of the image of the person A and the display range of the background image in the composite image shift toward the second direction in this system S. Moreover, the shift amount t2 of the display range of the background image is larger than the shift amount t1 of the display position of the image of the person A. The image reflecting the appearance when the person B views the person A from the position of the face after the movement is displayed on the display 5 of the person B by causing the composite image to transition to the state where both the display position of the image of the person A and the display range of the background image are shifted by the shift amounts different from each other.

More clearly, when the person B is actually conversing with the person A face to face, and the face of the person B moves rightward/leftward, what is viewed from the position of the person B after the movement appears at a position shifted from the initial position. On this occasion, an object closer to the person B appears at a position shifted from the initial position by a smaller shift amount, and an object farther to the person B appears at a position shifted from the initial position by a larger shift amount. In order to reproduce such an appearance in this system S, when the lateral movement of the person B is detected, the composite image is caused to transition so that the display position of the image of the person A and the display range of the background image are shifted by the respective shift amounts different from each other. Moreover, as described before, the shift amount t2 of the display range of the background image is larger than the shift amount t1 of the display position of the image of the person A. As a result, it is possible to view an image of a range which is out of the background image and has not displayed in the initial composite image (composite image before the movement of the face of the person B), in other words, so-called looking-in is available in the composite image after the transition processing.

<Case in which Change in Depth Distance of Person A is Recognized>

A case in which the person A moves backward from the initial position, specifically, the depth distance of the person A changes from the reference distance d1 to a distance d2 larger than the reference distance d1 is assumed in this case as shown in FIG. 7B.

The distance identification unit 18 is monitoring the depth distance of the person A during the period in which the composite image is being displayed on the display 5 of the person B (in other words, during the period in which the camera 2 of the person A is taking the image of the person A). Moreover, when the depth distance of the person A changes, the distance identification unit 18 recognizes the change, and identifies the depth distance after the change (namely, the distance d2).

Additionally, when the distance identification unit 18 recognizes the change in the depth distance of the person A, the composite image display unit 16 carries out adjustment processing of adjusting the display size of the image of the person A in the composite image. The adjustment processing adjusts the display size of the image of the person A so as to be the display size before the change in the position of the person A in the depth direction, namely the life size, based on the depth distance d2 after the change identified by the distance identification unit 18.

Figure 9A:
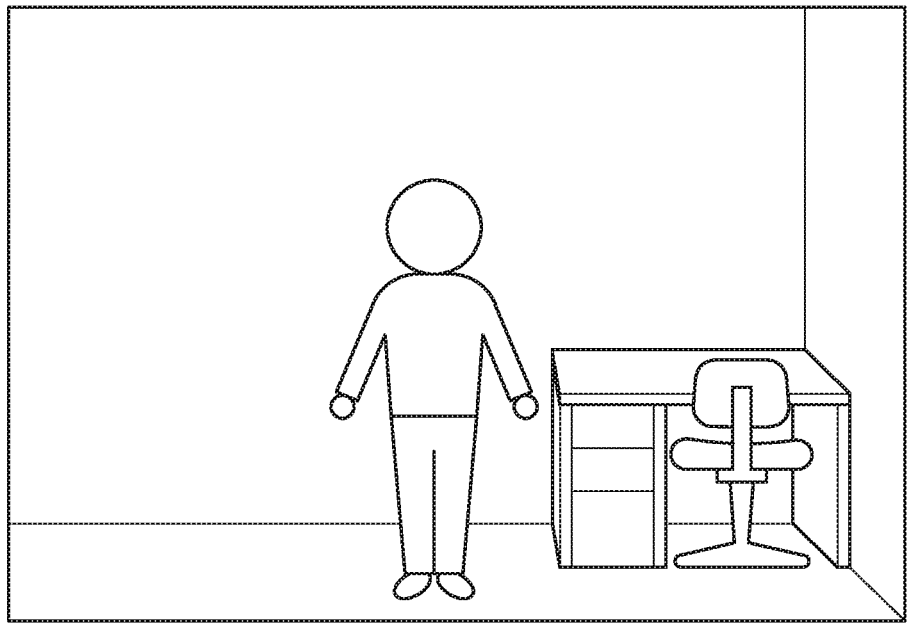
FIGS. 9A and 9B show explanatory diagrams of an execution result of adjustment processing.
Figure 9B:
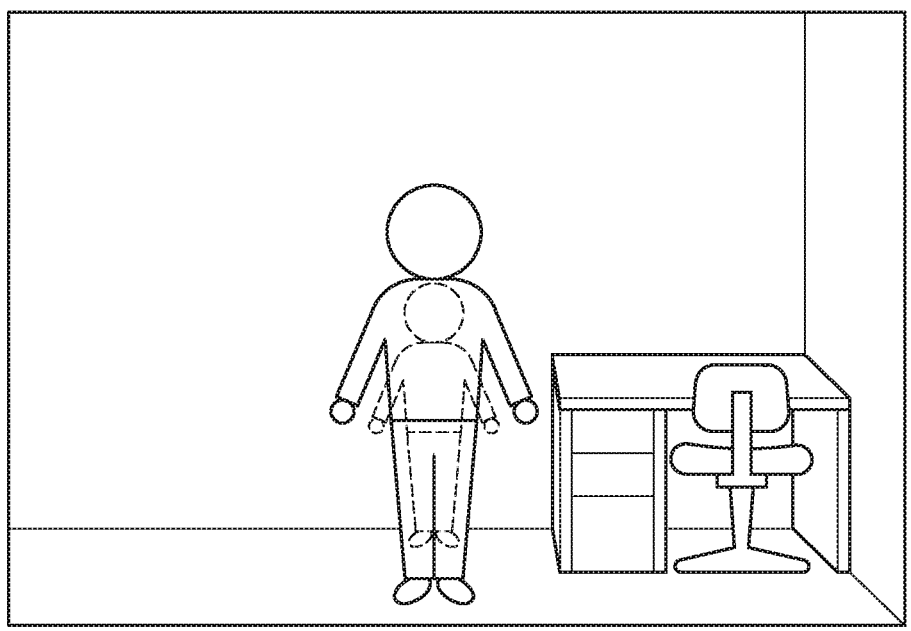

For a description of the adjustment processing, a description will now be given of a reason for the adjustment processing. When the person A is at the initial position, in other words, the depth distance of the person A is the reference distance d1, and the image of the person A taken by the camera 2 is displayed on the display 5, this image is displayed in the life size as shown in FIG. 9A. Additionally, when the person A moves backward from the initial position, and the taken image by the camera 2 is directly displayed on the display 5 of the person B, the image is displayed in a size somehow smaller than the life size as shown in FIG. 9B (size represented as broken lines in FIG. 9B). Such a change in the display size is caused by a characteristic of the camera 2 (specifically, an optical characteristic of lenses).

When the depth distance of the person A changes as described before, the display size of the taken image of the camera 2 unavoidably changes due to the characteristic of the camera 2. In contrast, when the person A is actually conversing with the person B face to face, and the person A approaches or separates from the person A more or less, the figure (size) of the person A viewed from the person B appears not to change by the human eyes. Thus, even when the depth distance of the person A changes, the display size of the image of the person A is adjusted so as to remain still in the life size in order to reproduce the above-mentioned way of appearance in this system S.

Specifically, when the depth distance of the person A changes from d1 to d2, the adjustment processing corrects the display size of the image of the person A by multiplying the display size (a longitudinal size and a lateral size of the image in a strict sense) by a ratio (d1/d2) of the depth distances. Then, the composite image display unit 16 composes the corrected image of the person A and the background image with each other, and displays the composite image on the display 5. As a result, even when the depth distance of the person A changes, the image of the person A is displayed in the display size before the change in the depth distance as shown in FIGS. 9A and 9B. When the depth distance of the person A changes, as a result of the adjustment of the display size of the image of the person A reflecting the size of the person A when the person B actually faces the person A in this way, the sense of presence (sense of reality) of the conversation using this system S further increases. It should be noted that FIGS. 9A and 9B show explanatory diagrams of an execution result of the adjustment processing, FIG. 9A shows a composite image before the adjustment processing, and FIG. 9B shows a composite image after the adjustment processing.

<<Image Display Flow>>

A description will now be given of a flow of a series of data processing relating to the image display, namely an image display flow, out of the face-to-face conversation using this system S. On this occasion, an image display method according to the present invention is applied to the image display flow described hereinafter. In other words, hereinafter, as a description of the image display method according to the present invention, a description will be given of a flow of the image display flow to which the image display method is applied. In other words, each step of the image display flow described hereinafter corresponds to a component of the image display method according to the present invention.

It should be noted that a description will now be given of the case in which the image of the person A and the background image (image acquired by compositing both the images with each other in a strict sense) are displayed on the display 5 of the person B as an example. Incidentally, a procedure of displaying the image of the person B and the background on the display 5 of the person A is substantially the same as the following procedure.

Figure 10:
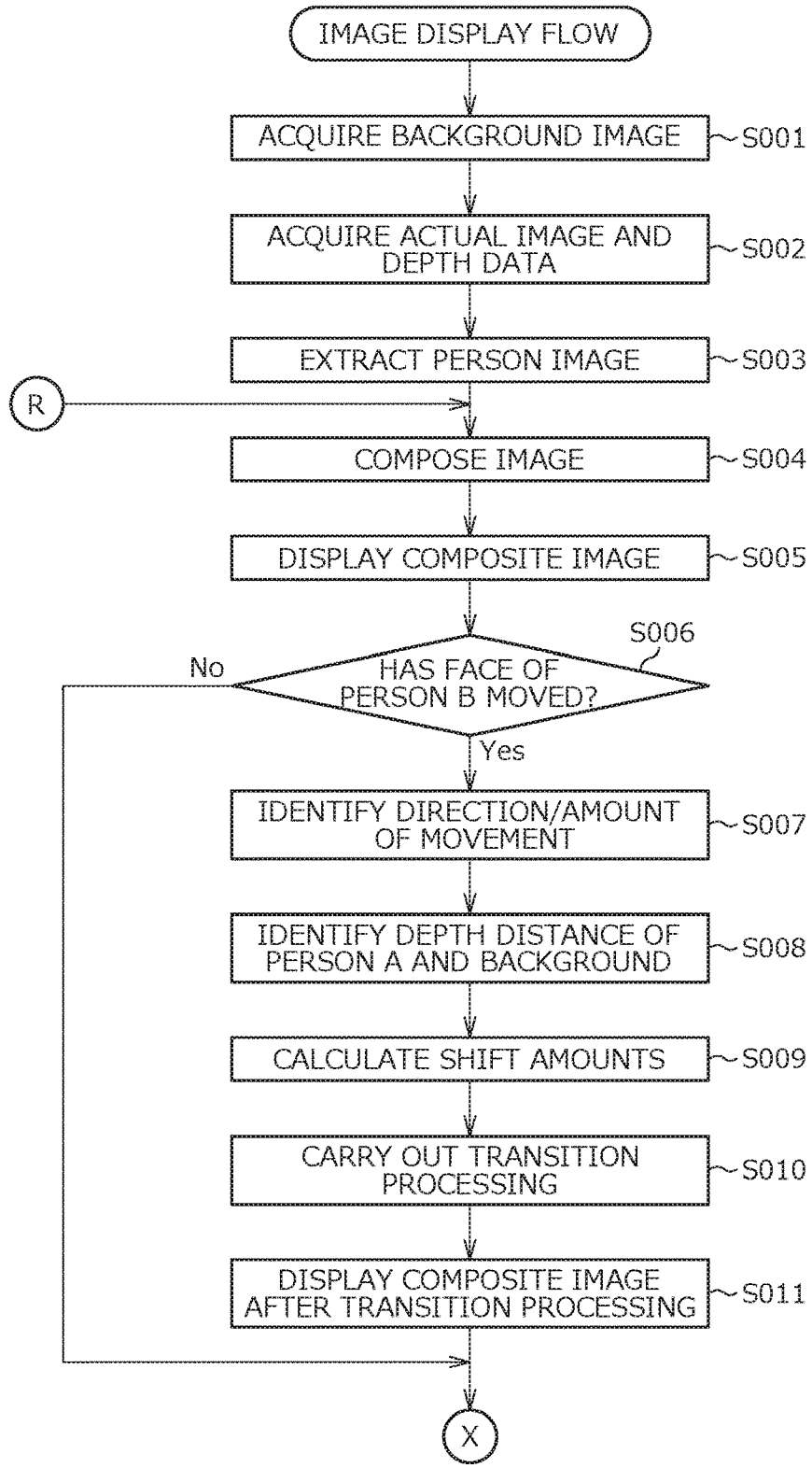
FIG. 10 is a flowchart (part 1) of a flow of an image display flow.
Figure 11:
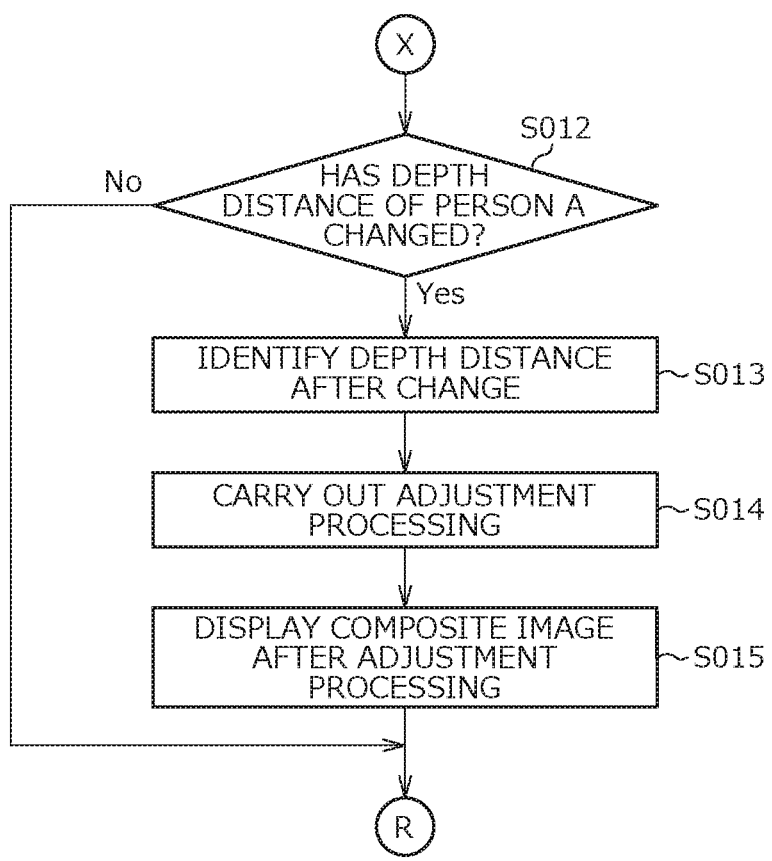
FIG. 11 is a flowchart (part 2) of the flow of the image display flow.

The image display flow is caused to proceed by the home server 1 of the person B, which is the computer, carrying out the steps shown in FIGS. 10 and 11. FIGS. 10 and 11 are flowcharts showing the flow of the image display flow. Specifically, first, the home server 1 of the person B communicates with the server 1 of the person A, thereby receiving the image data on the background image (S001). As a result, the home server 1 of the person B acquires an image of the room used by the person A for the face-to-face conversation as the background image. It should be noted that Step S001 is carried out in a period in which the camera 2 of the person A is taking the image of only the background, in other words, the person A is not in the room in which the face-to-face conversation is carried out. Moreover, the received image data of the background image is stored in the hard disk drive or the like of the home server 1 of the person B.

Then, when the person A enters the room for the face-to-face conversation, and starts the face-to-face conversation, the camera 2 installed in this room takes the image of the person A and the background, namely the actual image. Then, the home server 1 of the person A transmits image data on the actual image taken by the camera 2, and the home server 1 of the person B receives this image data (S002). As a result, the home server 1 of the person B acquires the actual image. Moreover, the home server 1 of the person A transmits the depth data on the actual image together with the image data on the actual image. Thus, the home server 1 of the person B receives both the image data and the depth data on the actual image, and acquires the actual image and the depth data on the actual image in a state where both of them forms a set (S002).

Then, the home server 1 of the person B extracts a person image, specifically the image of the person A, from the acquired actual image (S003). Specifically, the home server 1 of the person B identifies a skeleton model of the person A from the depth data on the actual image acquired in Step S002, and then extracts the image of the person A from the actual image based on this skeleton model.

After the image of the person A is extracted, the home server 1 of the person B composes the image of the person A and the image in the predetermined range (display range) out of the background image acquired last with each other (S004). Then, the home server 1 of the person B displays the composite image on the display of the person B (S005). As a result, the image of the person A in front of the background image is displayed in the life size on the display 5 of the person B.

On the other hand, the home server 1 on the person B acquires the actual image (image of the person B and the background thereof) taken by the camera 2 of the person B, and acquires the depth data on the actual image based on the measurement result from the infrared sensor 4 during the period in which the composite image is being displayed on the display 5 of the person B. Moreover, the home server 1 of the person B determines whether or not the face of the person B has laterally moved based on the acquired depth data during the period in which the composite image is being displayed on the display 5 of the person B (S006). Then, if the home server 1 of the person B determines that the face of the person B has laterally moved, the home server 1 of the person B identifies the direction and the amount of the movement of the face based on the depth data before the movement and the depth data after the movement (S007).

Further, the home server 1 of the person B identifies the respective depth distances of the person A and the background (such as the wall positioned behind the person A) based on the depth data acquired in Step S002 (S008). Then, the home server 1 of the person B calculates the shift amounts to be used in the subsequent transition processing carried out in Step S010 based on the respective values identified in Steps S007 and S008 (S009). More specifically, the respective shift amounts of the image of the person A and the background image are calculated in accordance with Formulae 1 and 2 in Step S009.

Then, the home server 1 of the person B carries out the transition processing after the calculation of the shift amounts (S010). As a result of the execution of the transition processing, the composite image displayed on the display 5 transitions from the state before the detection of the lateral movement of the face of the person B. Specifically, when the lateral movement toward the first direction of the face of the person B is detected, the home server 1 of the person B causes the composite image to transition to the state where the display position of the image of the person A and the display range of the background image acquired last in the composite image are shifted toward the second direction by the respective shift amounts calculated in Step S009 composite image in the transition processing. On this occasion, the shift amount of the display range of the background image is larger than the shift amount of the display position of the image of the person A.

When the transition processing is completed, the home server 1 of the person B displays the composite image after the transition processing, namely the composite image of a state where the display position of the image of the person A and the display range of the background image are shifted from those in the initial state on the display 5 (S001). As a result, the image reproducing the appearance when the person A is actually viewed from the position of the face of the person B after the lateral movement is displayed on the display 5. It should be noted that, as described before, the shift amount of the display position of the image of the person A is larger than the shift amount of the display range of the background image in the composite image after the transition processing. Therefore, the person B can move the face rightward/leftward to look into the image which is out of the background image, and has not initially displayed on the display 5.

Incidentally, the home server 1 of the person B determines whether or not the depth distance of the person A has changed based on the depth data acquired in Step S002 during the period in which the composite image is being displayed on the display 5 of the person B (S012). Then, when the home server 1 of the person B determines that the depth distance of the person A has changed, the home server 1 of the person B identifies the depth distance after the change based on the depth data after the change (S013).

Then, the home server 1 of the person B carries out the adjustment processing, and adjusts the display size of the image of the person A in accordance with the depth distance after the change identified in the previous step (S014). The display size is adjusted so that the image of the person A after the change in the depth distance is displayed in the display size before the change in the depth distance, namely in the life size, in the adjustment processing. When the adjustment processing is completed, the home server 1 of the person B displays on the display 5 the composite image after the adjustment processing, namely the composite image formed by compositing the image of the person A the display size of which is adjusted and the background image on the display 5 (S015). As a result, even after the depth distance of the person A is changed, the image of the person A to be displayed is displayed in the life size.

<<Variation of Image Display System>>

With the configuration of this system S described before, the appearance viewed by a second user (such as the person B), who is viewing the display 5, when a first user (such as the person A) and the second user actually face each other can be reflected to the image of the first user displayed on the display 5. As a result, the sense of presence (sense of reality) of the conversation through this system S can be increased.

On the other hand, regarding the image display system, a configuration providing the above-mentioned effect is not limited to the above-mentioned configuration, and other configurations (variations) are conceivable. A description will now be given of a first variation and a second variation of the image display system according to the present invention. It should be noted that a description of configurations the same as the above-mentioned configurations is omitted, and a description will be given only of different configurations hereinafter. Moreover, hereinafter, a description will be given of a case in which the composite image formed by compositing the image of the person A and the background image is displayed on the display 5 of the person B as an example.

<First Variation>

The composite image is caused to transition to the state where both the display position of the image of the person A and the display range of the background image acquired last in the composite image are shifted in the transition processing in the above-mentioned image display system (namely, this system S). Moreover, the shift amount of the display range of the background image is larger than the shift amount of the display position of the image of the person A in the above-mentioned configuration. It should be noted that a magnitude relationship between the shift amounts may be different from the abovementioned magnitude relationship.

In other words, the shift amount of the display position of the image of the person A may be larger than the shift amount of the display range of the background image. This configuration corresponds to a first variation. More specifically, when the face of the person B laterally moves while the composite image is displayed on the display 5 of the person B, the home server 1 of the person B (the detection unit 17 in a strict sense) detects the lateral movement of the face, and is triggered by the detection to carry out the transition processing. Then, the composite image is caused to transition to a state where the display position of the image of the person A is shifted larger in the shift amount than the display range of the background image in the transition processing according to the first variation. It should be noted that when the face of the person B transitions toward the first direction, the display position of the image of the person A and the display range of the background image are shifted toward the direction opposite to the first direction (namely the second direction) in the transition processing according to the first variation.

Figure 12A:
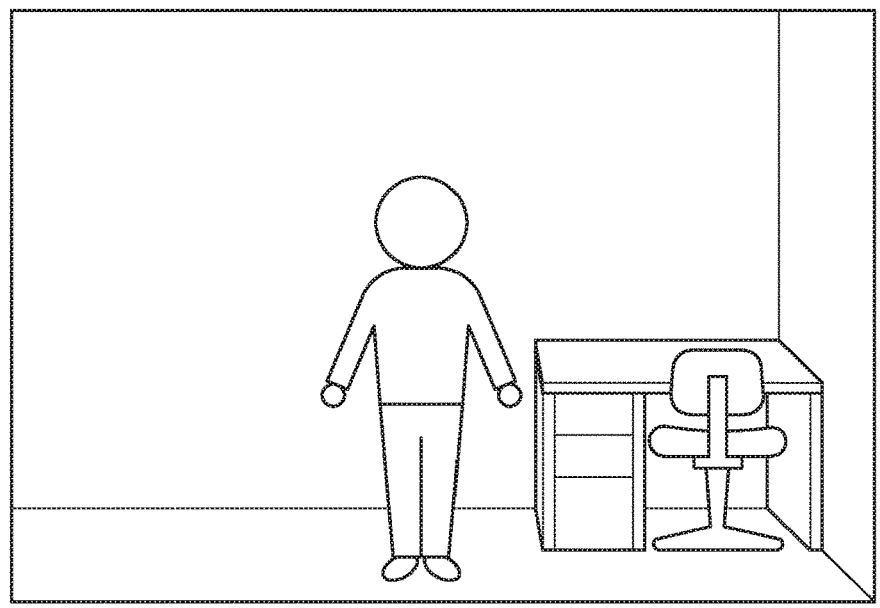
FIGS. 12A and 12B show explanatory diagrams of the transition processing according to a first variation.
Figure 12B:
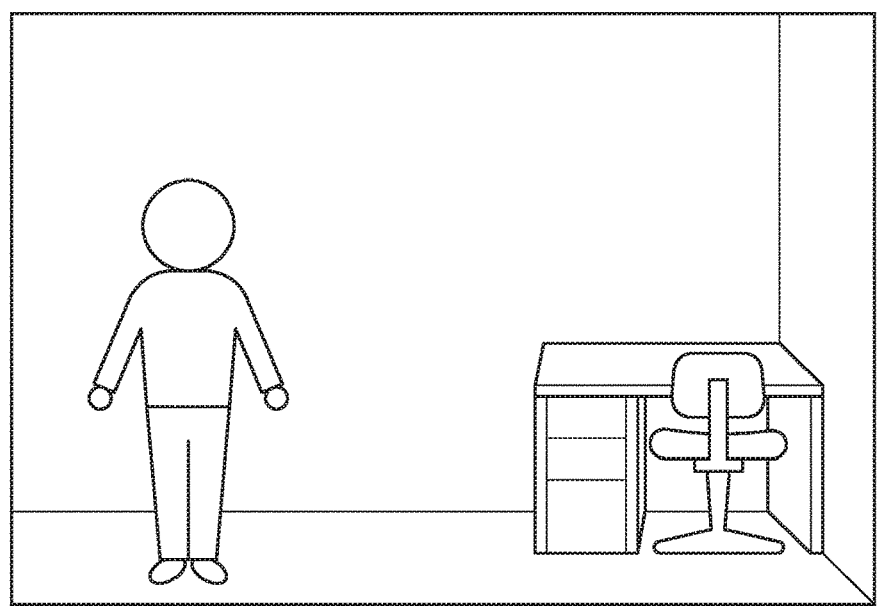

Then, the composite image shown in FIG. 12A is initially displayed on the display 5 of the person B, and the composite image gradually transitions to the state shown in FIG. 12B in association with the lateral movement of the face of the person B as a result of the execution of the above-mentioned transition processing according to the first variation. FIGS. 12A and 12B show explanatory diagrams of the change in the composite image when the transition processing according to the first variation is carried out, FIG. 12A shows a composite image before the transition processing, and FIG. 12B shows a composite image after the transition processing.

As described before, when the face of the person B laterally moves, the state of the composite image displayed on the display 5 transitions to the state where the display position of the image of the person A is shifted by the shift amount larger than the shift amount of the display range of the background image according to the first variation. This is because the subject toward which the line of sight of the person B directs is considered.

More clearly, if the case in which the person B actually faces the person A is assumed, the line of sight of the person B usually directs to the person A. In this case, when the face of the person B moves rightward/leftward, an object farther from the person B appears at a position shifted from the initial position by a larger shift amount as described before. Therefore, with the above-mentioned configuration (namely, the configuration for carrying out the transition processing shown in FIG. 8), the display range of the background image is shifted by the shift amount larger than the shift amount of the display position of the image of the person A in order to reproduce the above-mentioned appearance.

In contrast, when the face of the person B moves rightward/leftward while the line of sight of the person B is directing the background (such as the wall behind the person A), a nearer object to the person B appears at a position shifted from the initial position by a larger shift amount. According to the first variation, in order to reproduce this appearance, namely the appearance when the line of sight of the person B is directing to the background of the person A, the display position of the image of the person A is shifted by a shift amount larger than a shift amount of the display range of the background image. As a result, when the face of the person B laterally moves while the line of sight of the person B is directing to the background of the person A, the composite image displayed on the display 5 can be an image reflecting the appearance viewed from a position of the face after the movement of the person B.

It should be noted that an execution mode of the transition processing may be freely switched between a mode (corresponding to the configuration described first) in which the shift amount of the display range of the background image is set to be larger and a mode (corresponding to the first variation) in which the shift amount of the display position of the image of the person A is set to be larger. In this case, the transition processing is appropriately carried out in accordance with the direction of the line of sight of the person B at the moment.

<Second Variation>

It is assumed that furniture or an architectural material having a mirror portion, specifically, the full length mirror installed in the room in which the person A is present for the face-to-face conversation is used as the display 5 for displaying the image in the above-mentioned display system (namely this system S). As a result, there is provided such a presentation effect that the space in which the person B is present and the space in which the person A is present are connected with each other through the glass, and the sense of presence of the conversation can be increased.

Figure 13A:
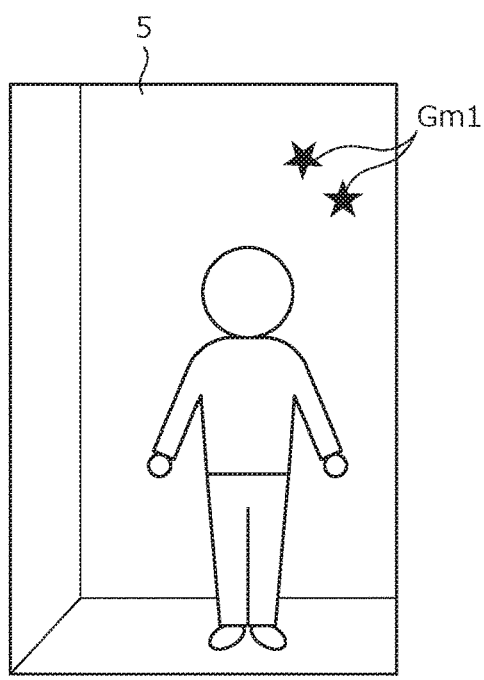
FIGS. 13A to 13D show diagrams of composite images displayed on a display according to a second variation.
Figure 13B:
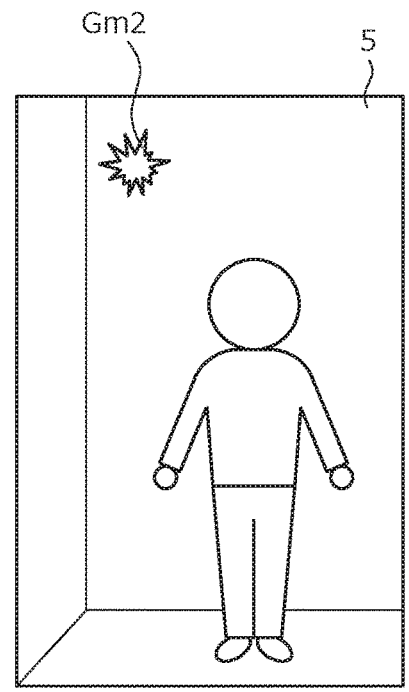
Figure 13C:
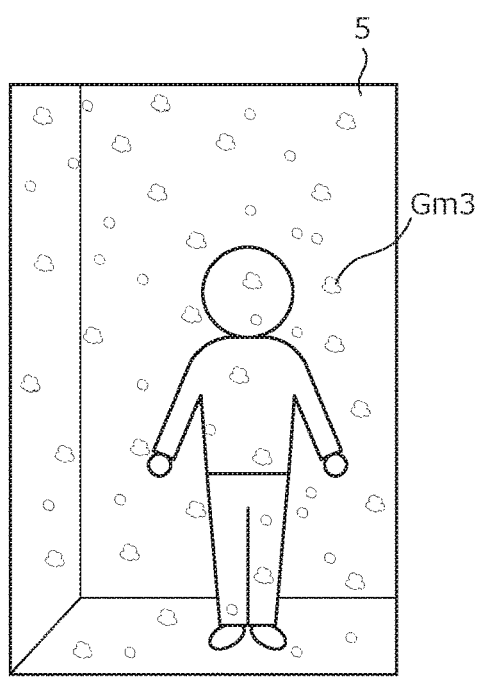
Figure 13D:
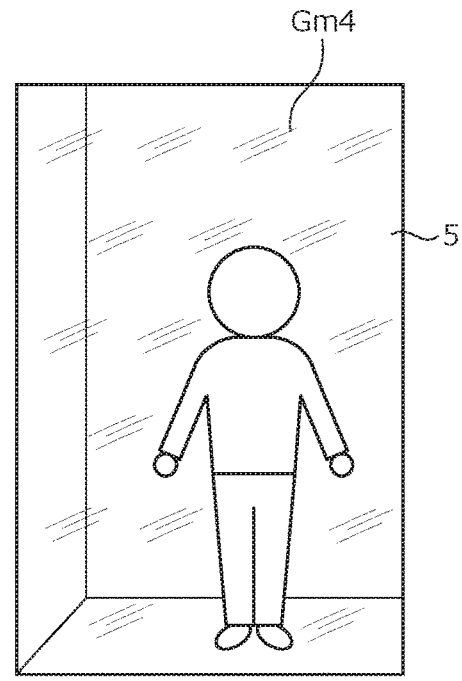
Figure 14:
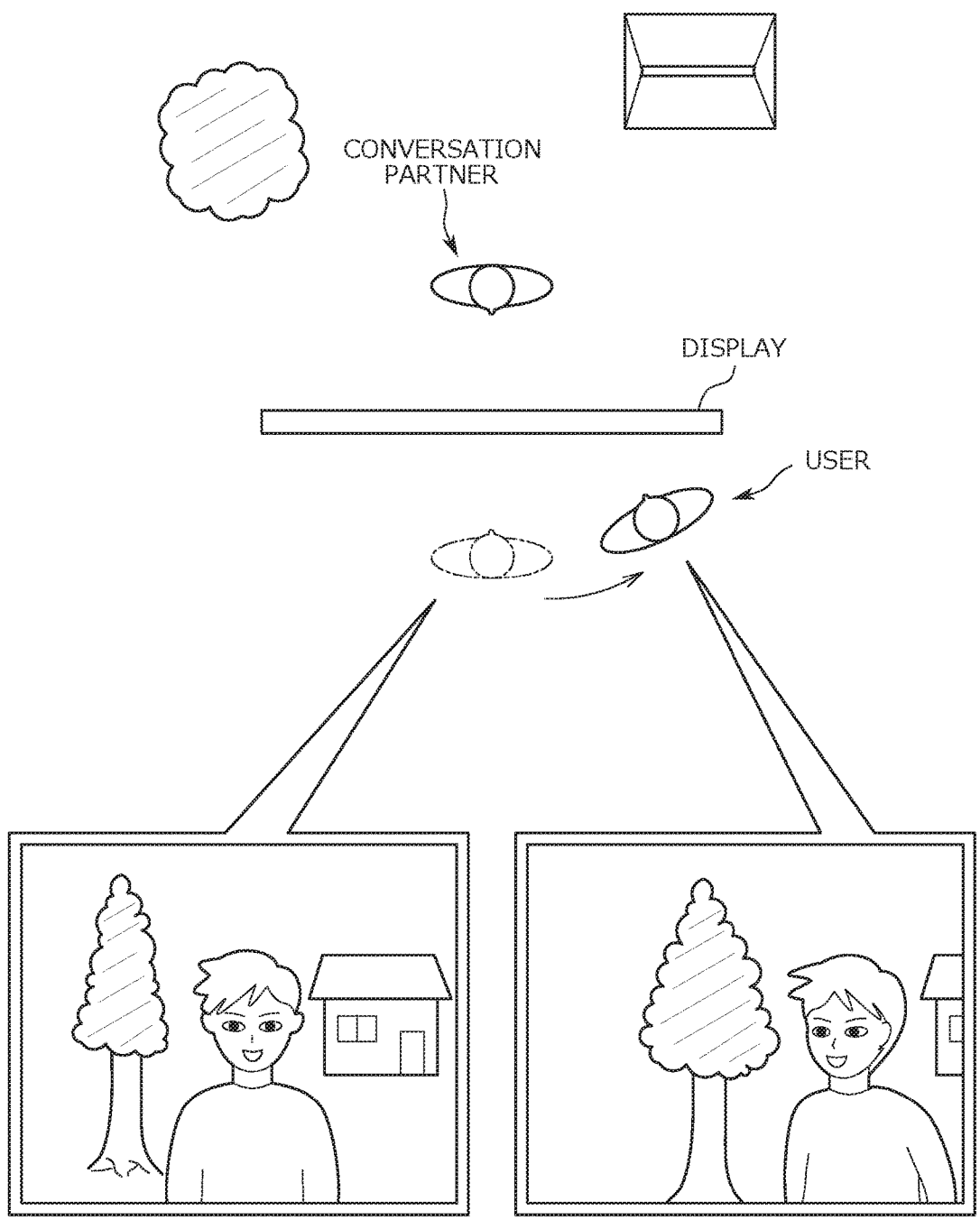
FIG. 14 is a diagram of a state where an image changes in association with a movement of a user viewing a display screen in a conventional image display system.
Figure 15:
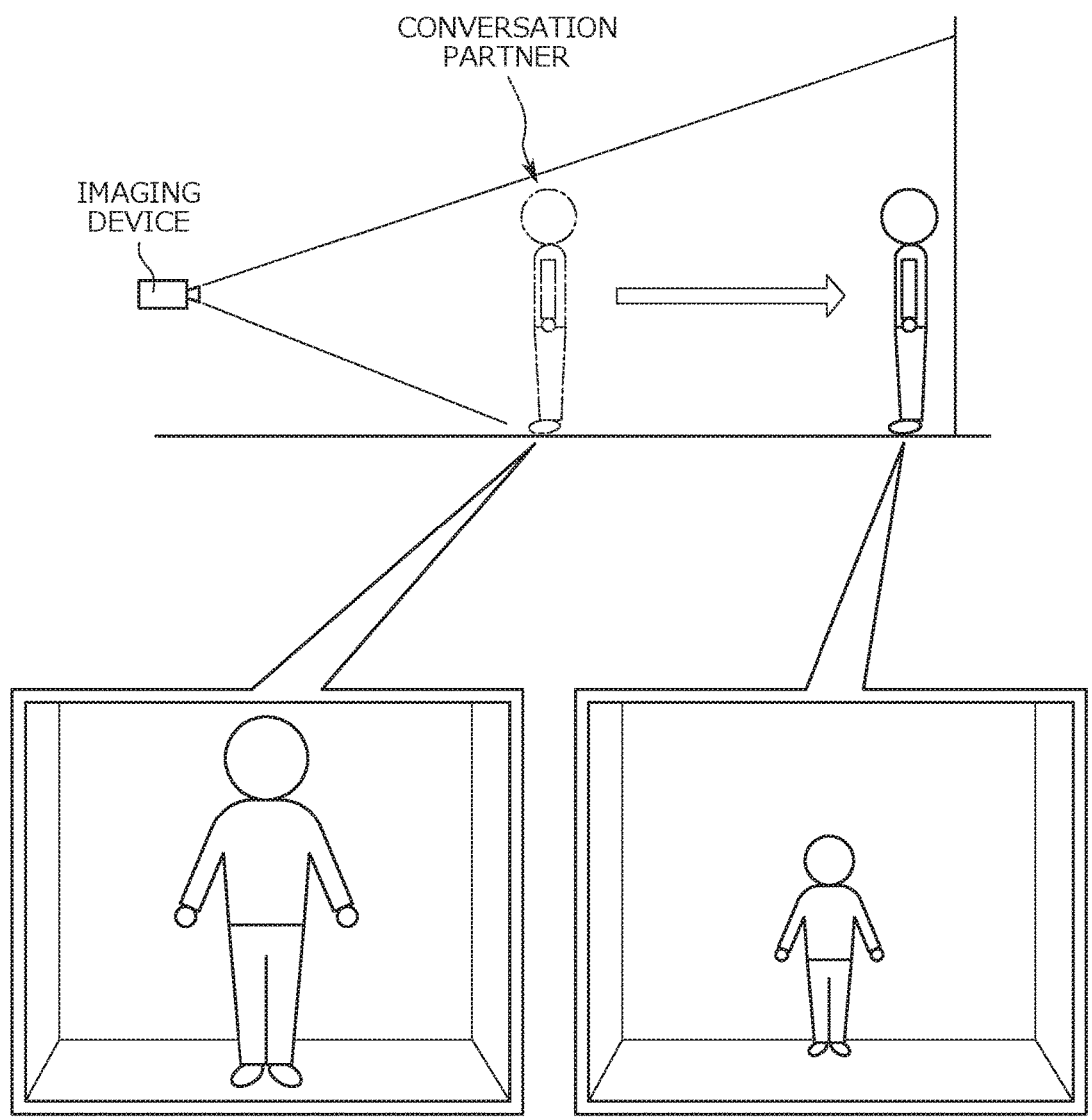
FIG. 15 is a diagram of a state where an image of a conversation partner is displayed in a display size in accordance with a depth distance of the conversation partner in the conventional image display system.

In order to more effectively exert the presentation effect according to the second variation, a gimmick image is displayed on the display 5. The gimmick image means a design and a figure imitating a quality or a surface state of the mirror portion constructing the display screen of the display 5, or a design and a figure for decoration prepared in advance. As a specific example of the gimmick image, star marks Gm1 shown in FIG. 13A, a crack image Gm2 shown in FIG. 13B, a water drop pattern Gm3 shown in FIG. 13C, and a pattern Gm4 imitating recesses and protrusions of a glass surface shown in FIG. 13D are mentioned. FIGS. 13A to 13D show diagrams of composite images displayed on the display 5 according to the second variation, and FIGS. 13A to 13D show the variations of the gimmick image.

Then, the home server 1 (the composite image display unit 16 in a strict sense) of the person B displays the composite image in which the above-mentioned gimmick image is appearing in front of the person A on the display 5 according to the second variation. The appearance of the gimmick in front of the person A emphasizes the presence of the mirror portion of the display 5 (increases a sense of depth). As a result, such a presentation effect that the space in which the person B is present and the space in which the person A is present are connected with each other via the glass is more effectively exerted. It should be noted that at least one of the designs and figures as shown in FIGS. 13A to 13D only needs to be used as the gimmick image, but a plurality thereof may be used. Moreover, the gimmick image may be a still image or a moving image.

Other Embodiments

In the above-mentioned embodiment, a description is given of the image display system and the image display method according to the present invention while the specific examples are provided. However, the embodiment is simply an example for promoting understanding of the present invention, and do not limit the present invention. In other words, it should be understood that the present invention can be changed and improved without departing from the gist thereof, and the present invention includes equivalences thereof.

Moreover, a description is given a case in which the two users (the person A and the person B) carry out the face-to-face conversation through this system S as an example in the above-mentioned embodiment, but the present invention is not limited to this case, and the number of persons who can simultaneously carry out the face-to-face conversation may be three or more.

Moreover, both the display position of the image of the first user in the composite image and the range (display range) included in the composite image out of the background image are shifted in the transition processing carried out when the movement of the face of the second user is detected according to the above-mentioned embodiment. It should be noted that the present invention is not limited to this case, only one of the display position of the image of the first user and the display range of the background image may be shifted, and the other one may be fixed (not shifted).

Moreover, the display screen (front surface of the touch panel 5a in a strict sense) of the display 5 is set as the reference surface, and the distance from the display screen is set as the depth distance according to the above-mentioned embodiment. It should be noted that the position of the reference surface is not particularly restricted, and a surface different from the display screen of the display 5 may be set as the reference surface.

Moreover, the image of the space corresponding to the background taken when the first user is not present in this space is used as the background image subject to the image composition (composition subject image) according to the above-mentioned embodiment. It should be noted that the present invention is not limited to this case, and the person image and the background image may be separated from the image when the camera 2 simultaneously takes the first user and the background, namely the actual image, and the separated background image may be used as the image to be composited, for example. In this case, an image of a portion overlapping the person image out of the background image is lacking, and thus needs to be complemented. In contrast, if the background image taken by the camera 2 when the first user is absent is used as the image to be composited, the above-mentioned lack of the image does not exist, the image complementation is thus not necessary, and the background image can more easily be acquired accordingly.

Moreover, the transition processing is carried out so that, when the face of the second user moves, the image (composite image) reproducing the appearance when the first user is actually viewed from the position of the face after the movement is displayed according to the above-mentioned embodiment. It should be noted that the present invention is not limited to this case, and the transition processing may be carried out so that an image (composite image) different from the appearance when the first user is actually viewed is intentionally displayed.

REFERENCE SIGNS LIST

1: Home server
2: Camera (imaging device)
3: Microphone
4: Infrared sensor
  4*a*: Light emission unit
  4*b*: Light reception unit
5: Display
  5*a*: Touch panel
6: Speaker
11: Data transmission unit
12: Data reception unit
13: Background image storage unit
14: Person image extraction unit
15: Skeleton model storage unit
16: Composite image display unit
17: Detection unit
18: Distance identification unit
100: Communication unit
GN: External communication network
S: This system

The invention claimed is:

1. An image display system for displaying an image of a first user on a display of a second user, comprising:
  a server programmed to:
    acquire an image of the first user taken by a camera and an image of a background taken by the camera;
    compose the image of the first user and the image of the background with each other, and display on the display a composite image in which the first user is positioned in front of the background; and
    detect a movement of a face of the second user with respect to the display, wherein:
    when the movement of the face is detected, transition processing is carried out causing the composite image displayed on the display to transition from a state before detecting the movement of the face,
    the server causing the composite image to transition to a state where one of a display position of the image of the first user in the composite image and a range included in the composite image out of the image of the background acquired by the server is shifted along a movement direction of the face by a shift amount larger than a shift amount of the other in the transition processing, and either
    two directions, which are directions opposite to each other in a widthwise direction of the display, are set to a first direction and a second direction, and when detecting that the face moves toward the first direction, the server causes the composite image to transition to a state where the range is shifted toward the second direction by a shift amount larger than a shift amount of the display position in the transition processing, or
    two directions, which are directions opposite to each other in a widthwise direction of the display, are set to a first direction and a second direction, and when detecting that the face moves toward the first direction, the server causes the composite image to transition to a state where the display position is shifted toward the second direction by a shift amount larger than a shift amount of the range in the transition processing.

2. The image display system according to claim 1, wherein the server is further programmed to identify a distance from a reference surface having a direction extending through the display as a normal direction, wherein, when detecting that the face moves toward the first direction, the server causes the composite image to transition to a state where the display position is shifted toward the second direction by a shift amount corresponding to a distance between the reference surface and the first user identified, and the range is shifted toward the second direction by a shift amount corresponding to a distance between the reference surface and the background identified in the transition processing.

3. The image display system according to claim 1, wherein the server is further programmed to identify a distance from a reference surface having a direction extending through the display as a normal direction, wherein, when the position of the first user changes in the normal direction while the camera is taking the image of the first user, the server carries out adjustment processing of adjusting a display size of the image of the first user in the composite image so as to be the display size before the position of the first user changes based on the distance between the reference surface and the first user identified.

4. The image display system according to claim 1, wherein:
  the display is installed in a room where the second user is present, and presents an appearance as furniture or an architectural material while the composite image is not displayed, the furniture or the architectural material installed in the room and having a mirror surface portion; and
  the server displays the composite image on the mirror surface portion of the furniture or the architectural material forming the display when the composite image is displayed.

5. The image display system according to claim 4, wherein the server displays on the display the composite image in which at least one of a predetermined design and a figure appears in front of the first user.

6. The image display system according to claim 1, wherein the server acquires as the image of the background an image of a space corresponding to the background taken by the camera when the first user is not present in the space.

7. An image display method of displaying an image of a first user on a display of a second user, comprising using a computer to perform the steps of:

acquiring an image of the first user taken by a camera and an image of a background taken by the camera;

compositing the acquired image of the first user and the acquired image of the background with each other, and displaying on the display a composite image in which the first user is positioned in front of the background; and detecting a state where a face of the second user moves with respect to the display,
wherein:
when movement of the face is detected, the computer carries out transition processing of causing the composite image displayed on the display to transition from a state before the detection of the movement of the face, the composite image is caused to transition to a state where one of a display position of the image of the first user in the composite image and a range included in the composite image out of the image of the background is shifted along a movement direction of the face by a shift amount larger than a shift amount of the other in the transition processing, and either two directions, which are directions opposite to each other in a widthwise direction of the display, are set to a first direction and a second direction, and when detecting that the face moves toward the first direction, causing the composite image to transition to a state where the range is shifted toward the second direction by a shift amount larger than a shift amount of the display position in the transition processing, or two directions, which are directions opposite to each other in a widthwise direction of the display, are set to a first direction and a second direction, and when detecting that the face moves toward the first direction, causing the composite image to transition to a state where the display position is shifted toward the second direction by a shift amount larger than a shift amount of the range in the transition processing.

8. An image display system for displaying an image of a first user on a display of a second user, comprising:
a server programmed to:

acquire an image of the first user taken by a camera and an image of a background taken by the camera;

compose the image of the first user and the image of the background with each other, and display on the display a composite image in which the first user is positioned in front of the background;

detect a movement of a face of the second user with respect to the display; and identify a distance from a reference surface having a direction extending through the display as a normal direction, wherein:

when the position of the first user changes in the normal direction while the camera is taking the image of the first user, the server carries out adjustment processing of adjusting a display size of the image of the first user in the composite image so as to be the display size before the position of the first user changes based on the distance between the reference surface and the first user identified, when the movement of the face is detected, the server carries out transition processing of causing the composite image displayed on the display to transition from a state before detecting the movement of the face, and the server causes the composite image to transition to a state where one of a display position of the image of the first user in the composite image and a range included in the composite image out of the image of the background is shifted along a movement direction of the face by a shift amount larger than a shift amount of the other in the transition processing.

9. The image display system according to claim 8, wherein two directions, which are directions opposite to each other in a widthwise direction of the display, are set to a first direction and a second direction, and when detecting that the face moves toward the first direction, the server causes the composite image to transition to a state where the range is shifted toward the second direction by a shift amount larger than a shift amount of the display position in the transition processing.

10. The image display system according to claim 8, wherein two directions, which are directions opposite to each other in a widthwise direction of the display, are set to a first direction and a second direction, and when detecting that the face moves toward the first direction, the server causes the composite image to transition to a state where the display position is shifted toward the second direction by a shift amount larger than a shift amount of the range in the transition processing.

* * * * *